United States Patent
Boudreault et al.

(10) Patent No.: US 7,461,405 B2
(45) Date of Patent: Dec. 2, 2008

(54) MIXED-MEDIA DATA ENCODING

(75) Inventors: Yves Boudreault, Boisbriand (CA); Daniel J. Kraus, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 1744 days.

(21) Appl. No.: 09/842,317

(22) Filed: Apr. 26, 2001

(65) Prior Publication Data

US 2002/0162103 A1    Oct. 31, 2002

(51) Int. Cl.
*G06F 7/04*     (2006.01)
*G06K 9/00*     (2006.01)
*G06F 17/30*    (2006.01)
*H03M 1/68*     (2006.01)

(52) U.S. Cl. .............................. 726/27; 726/28; 726/29; 726/30

(58) Field of Classification Search .............. 726/27–30
See application file for complete search history.

(56) References Cited

U.S. PATENT DOCUMENTS

| | | | |
|---|---|---|---|
| 5,442,701 A | | 8/1995 | Guillou et al. |
| 6,185,684 B1* | | 2/2001 | Pravetz et al. ............... 713/182 |
| 6,240,516 B1* | | 5/2001 | Vainsencher ................ 713/190 |
| 6,457,130 B2* | | 9/2002 | Hitz et al. ..................... 726/27 |
| 6,477,653 B2* | | 11/2002 | Naito ........................... 726/27 |
| 6,490,686 B1* | | 12/2002 | Wheeler ....................... 726/27 |
| 6,718,218 B1* | | 4/2004 | Matheson .................... 700/95 |
| 6,807,534 B1* | | 10/2004 | Erickson ..................... 705/51 |
| 7,047,241 B1* | | 5/2006 | Erickson ........................ 707/9 |
| 7,069,192 B1* | | 6/2006 | Freitag .......................... 703/1 |
| 7,096,504 B1* | | 8/2006 | Tagawa et al. ................ 726/27 |
| 7,124,443 B2* | | 10/2006 | Ishibashi et al. .............. 726/26 |
| 7,155,745 B1* | | 12/2006 | Shin et al. ..................... 726/27 |
| 2001/0042043 A1* | | 11/2001 | Shear et al. ................... 705/51 |
| 2002/0073336 A1* | | 6/2002 | Toy et al. ..................... 713/201 |
| 2002/0083137 A1* | | 6/2002 | Rogers et al. ............... 709/205 |
| 2002/0103734 A1* | | 8/2002 | Glassco et al. ............... 705/35 |
| 2004/0107356 A1* | | 6/2004 | Shamoon et al. ............ 713/193 |

FOREIGN PATENT DOCUMENTS

GB    2248324 A    4/1992

OTHER PUBLICATIONS

Ritter, A Basic Introduction to Crypto A *Ciphers By Ritter* Page, Current Version: Jan. 9, 1999, Learning About Cryptography.

* cited by examiner

*Primary Examiner*—Nasser G Moazzami
*Assistant Examiner*—David García Cervetti
(74) *Attorney, Agent, or Firm*—Staas & Halsey LLP

(57) ABSTRACT

Mixed-media data, such as that including animation data (801), model data (802) and texture data (803) along with other media data types is encoded. To prevent unauthorized access. The data types are combined to produce a mixed-media data file (805). Passwords are added to produce an internal file with passwords (1103). A file key (1202) is combined with a program key (1203) to produce an encryption key (1204). The encryption key is used to encrypt the internal file (1103) to produce an encrypted internal file (1302). The file key (1202) is added to the encrypted internal file as part of a header to produce a coded export file (1401). In this way, a plurality of access keys may exist each providing different levels of access to a user.

45 Claims, 20 Drawing Sheets

MIXED-MEDIA DATA ENCODING

BACKGROUND OF THE INVENTION

1. Field of the Invention

The present invention relates to mixed-media data encoding, mixed-media data decoding and a format for the transfer of mixed-media data in encoded form.

2. Description of the Related Art

As used herein, mixed-media data is defined as the data that is read by a computer program in order to generate a media output in the form of images and sounds. A mixed-media data may include many data types, such as motion capture data, model data, deformation parameters, constraints, expressions or relations, textures, colour values, cameras, lights, video, audio, device information, a timeline or other data types in any combination. Thus, the data is not image data as such but is data that is used and processed and in order to obtain media output.

A problem with the dissemination of mixed-media data of this type is that the data itself represents highly valuable product and as such it would be highly undesirable for the data to be intercepted by unauthorised parties. It is also possible for a situation to arise in which an external party is allowed to do some things with the data while not being allowed to do other things with the data. In particular, organisations may also be very sensitive to the risks of modifiable three dimensional data being made available to none authorised users.

Encryption techniques are known for encrypting a file so as to prevent unauthorised access to that file. After a file has been encrypted, it is not possible for anyone to do anything with the file. Similarly, once the file has been decrypted it is then possible for anyone, with appropriate technology, to do anything with the file. Thus, a problem exists in that a technical mechanism is required to control the degree to which external parties may access and manipulate mixed-media data.

It is known to transfer machine readable data files in a protected form using cryptography techniques, however, a problem with known techniques is that they consider a file to be either encrypted or not encrypted. When encrypted, it is not possible for anyone to do anything with the file and when decrypted it is possible for anyone to do anything with the file. However, media data files include many components and many processes may be performed upon these components. Furthermore, some of these components are more sensitive than others.

BRIEF SUMMARY OF THE INVENTION

According to an aspect of the present invention, there is provided mixed-media data encoding apparatus, in which said mixed-media data includes a plurality of data types. The apparatus comprises encoding means configured to encode the mixed-media data to prevent unauthorised access and storage means configured to store the encoded data. User access to the data is possible in response to an accessing activity performed by a user. A first set of user modifications may be made to said data (a first level of access) in response to a first accessing activity and a second set of user modifications may be made to said data (a second level of access) in response to a second accessing activity.

BEST MODE FOR CARRYING OUT THE INVENTION

FIG. 1

Figure 1:
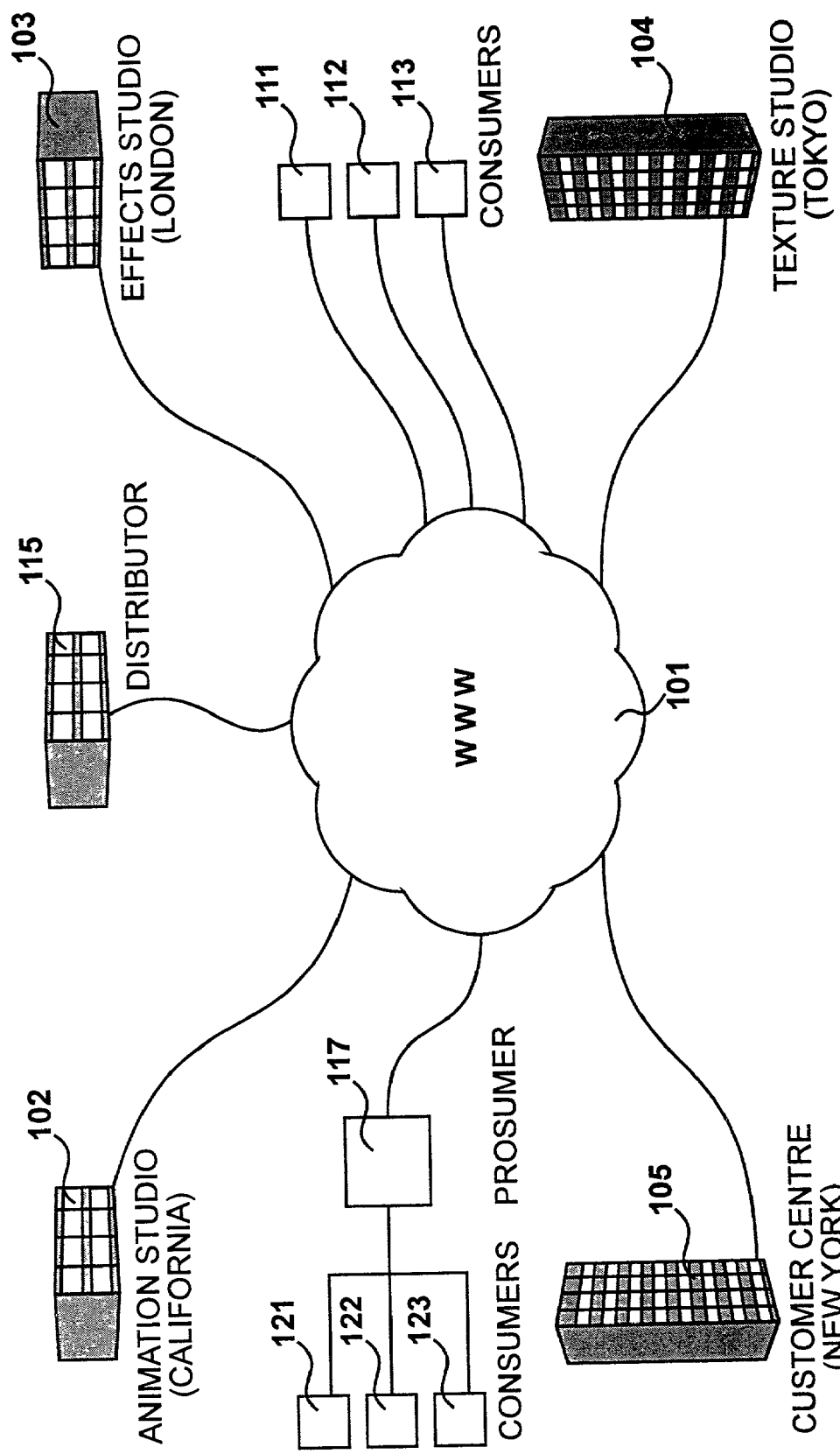
FIG. 1 shows an environment for the creation, distribution and delivery of mixed-media data.

An environment for the creation, distribution and consumption of media data is illustrated in FIG. 1. In the environment shown in FIG. 1, most data transfers take place over the World Wide Web 101, although mechanisms for data transfer, including local networks and physical storage media are equally valid.

A major producer of cinematographic works, including computer animation, has an animation studio 102 in California, an effects studio 103 in London and a texture studio 104 in Tokyo. In addition, a strong customer base exists in New York therefore a facility 105 is also included in New York for making presentations to potential customers etc.

During a typical production process, project work is initiated at animation studio 102 whereafter a data file is transmitted to texture studio 104 for two-dimensional textures to be added. In parallel with this or thereafter, data files are transmitted to effects studio 103 for special effects and video components to be included.

At any stage of the creative process, a file representing work in progress may be conveyed to the customer centre 105. However, it is appreciated that the customer centre 105 is not particularly secure, compared to studios 102, 103 and 104. Furthermore, data files may be given to potential customers to allow them to view them on their own premises. Consequently, although it should be possible to render and view images at the customer centre 105, it is undesirable for the data supplied to the customer centre 105 to be modifiable, particularly at the three-dimensional level. However, it is necessary in order for the work to be completed for the data files to be modifiable at the three studios. In particular, animation studio 102 must be given full access to the data whereas studio 103 must at least be able to modify video components and studio 104 must at least be able to modify texture components.

Finished works of animation are distributed to consumers, such as consumers 111, 112 and 113. In addition to receiving product by the World Wide Web, as illustrated in FIG. 1, consumers may also receive product as part of digital television broadcasts via a distributor 115.

From the perspective of the material author or distributor, entity 117 is considered to be a consumer. However, entity 117 do themselves provide modified product to consumers 121, 122 and 123 etc, which are then consumers to the distributor 115 once removed. Consequently, entity 117 is considered within this environment as a "prosumer" ie professional-consumer. The prosumer 117 pays royalties to the distributor that are higher than the royalties paid by consumers 111 etc. The prosumer is provided with a greater level of access to the three-dimensional data, although this access is not as great as that available to the animation studios.

For the purposes of this disclosure, it is assumed that animation studio 102 generates an animation that is partially complete. The animation data is then encoded and transferred to texture studio 104 in Tokyo. In Tokyo, the data is decoded, manipulated further, encoded again and then returned to animation studio 102. Similarly, at studio 102, the received data is decoded, manipulated further and then placed in a condition ready for distribution. Thus, animation studio 102, in this example, will be performing both an encoding process, to allow secure distribution of data to colleagues and will then also perform a decoding process in order for further manipulations on input data received from colleagues. The encoding process and decoding process will therefore be described with respect to a hardware facility provided at the animation studio 102 although it should be appreciated that similar equipment would exist where other users are being allowed access to the data.

FIG. 2

Figure 2:
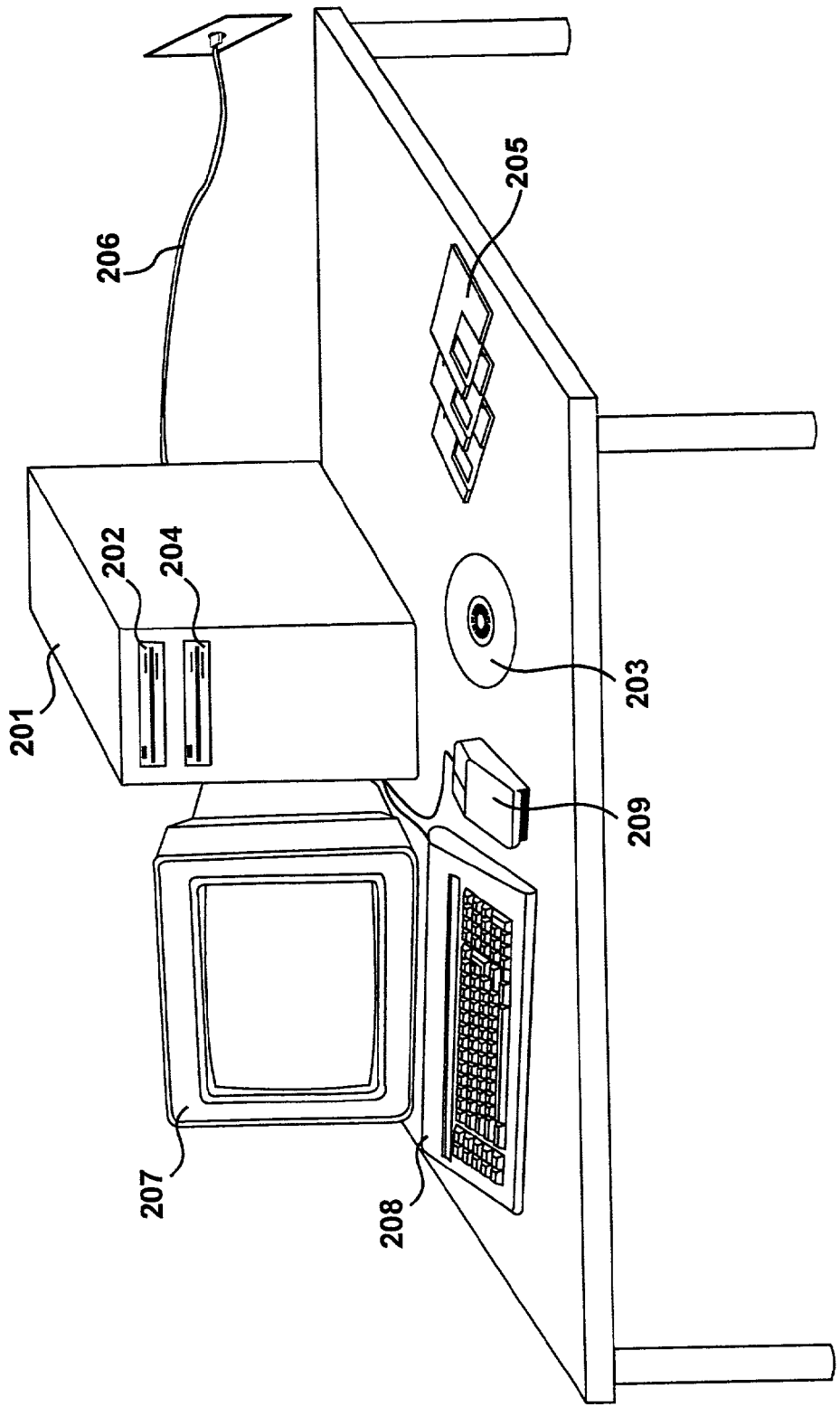
FIG. 2 shows a computer animation system.

A computer animation system based at the animation studio 102 is shown in FIG. 2. The animation system shown in FIG. 2 is configured to manipulate three-dimensional data having many elements, to combine these elements into a mixed-media file format and to facilitate the distribution of three-dimensional data files in an encoded form.

The system shown in FIG. 2 includes a programmable computer 201 having a Diagital Versatile Disk drive 202 for receiving Compact Disc Read-Only Media and Digital Versatile Disks 203, along with a disk drive 204 for receiving magnetic disks 205 such as zip disks. Computer system 201 may receive program instructions via an appropriate Compact Disc Read-Only Media 203 and data files may be transferred using zip drive 205 or via a network connection 206 connected to the World Wide Web 101. Output data is displayed on a visual display unit 207 and manual input is received via keyboard 208 and a mouse 209.

FIG. 3

Figure 3:
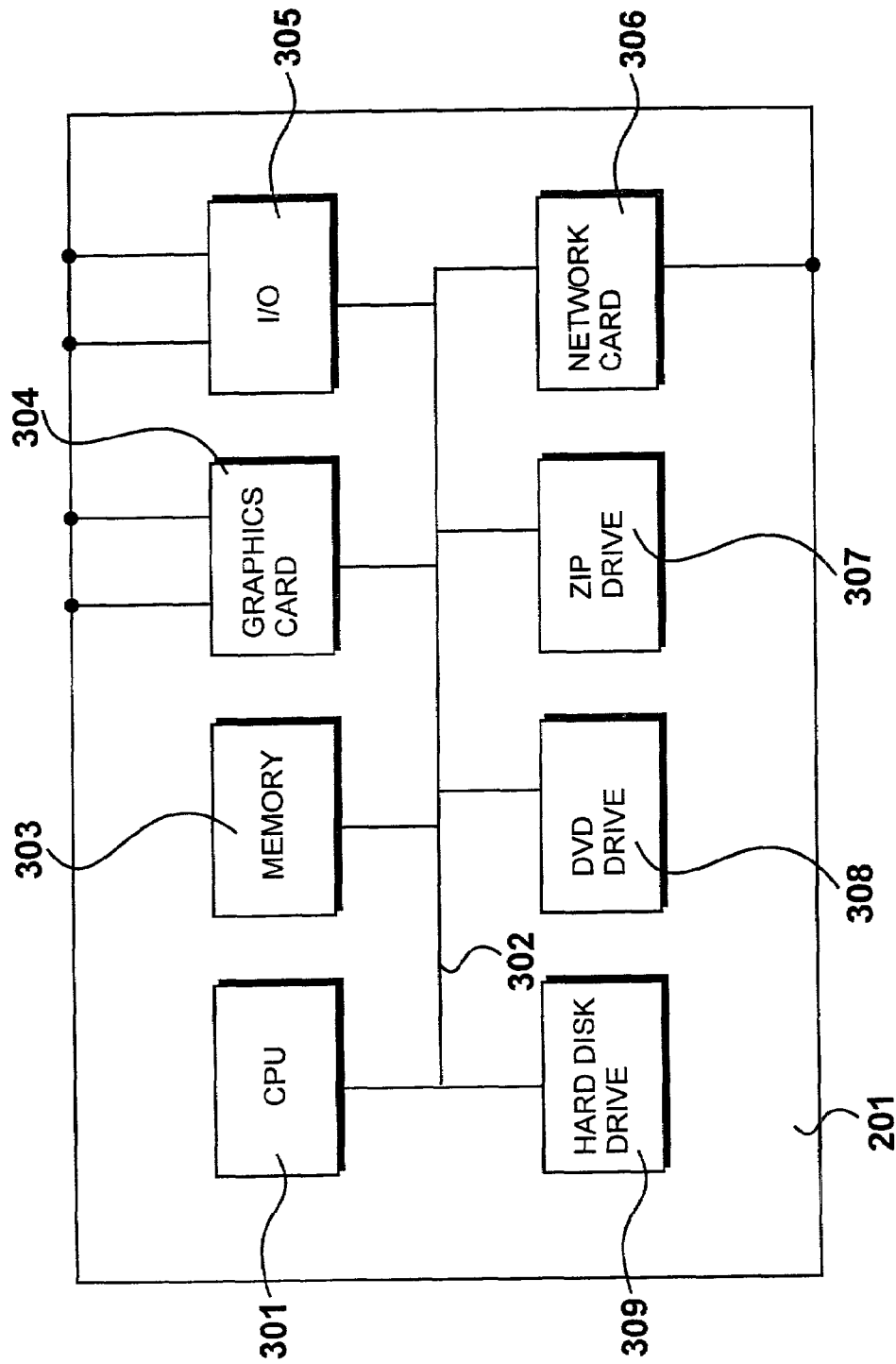
FIG. 3 details the computer system identified in FIG. 2.

Computer system 202 is illustrated in FIG. 3. The system includes a Pentium III central processing unit 301 operating under instructions received from random access memory 303 via a system bus 302. Memory 303 comprises one hundred and twenty megabytes of randomly accessible memory and executable programs which, along with data, are received via bus 302 from a hard disk drive 309. A graphics card 304, an input/output interface 305, a network card 306, a zip drive 307 and a DVD drive 308 are also connected to bus 302. Graphics card 304 supplies graphical data to visual display unit 207 and the input/output interface 305 receives input commands from a keyboard 208 and from a mouse 209. Zip drive 307 is primarily provided for the transfer of mixed-media data and the DVD drive is primarily used for the loading and installation of new executable instructions, usually provided on CD ROM.

The preferred embodiment of the present invention provides for the creation and manipulation of three-dimensional image data followed by an encoding process to allow the data to be transferred to other stations in a protected form. For the purposes of this disclosure, this first stage will be referred to as an encoding operation. Similarly, it is also possible for the station shown in FIG. 2 to receive encoded data, decode this data and then perform further manipulations upon the data. For the purposes of this disclosure, such a process will be referred to as a decoding operation.

FIG. 4

Figure 4:
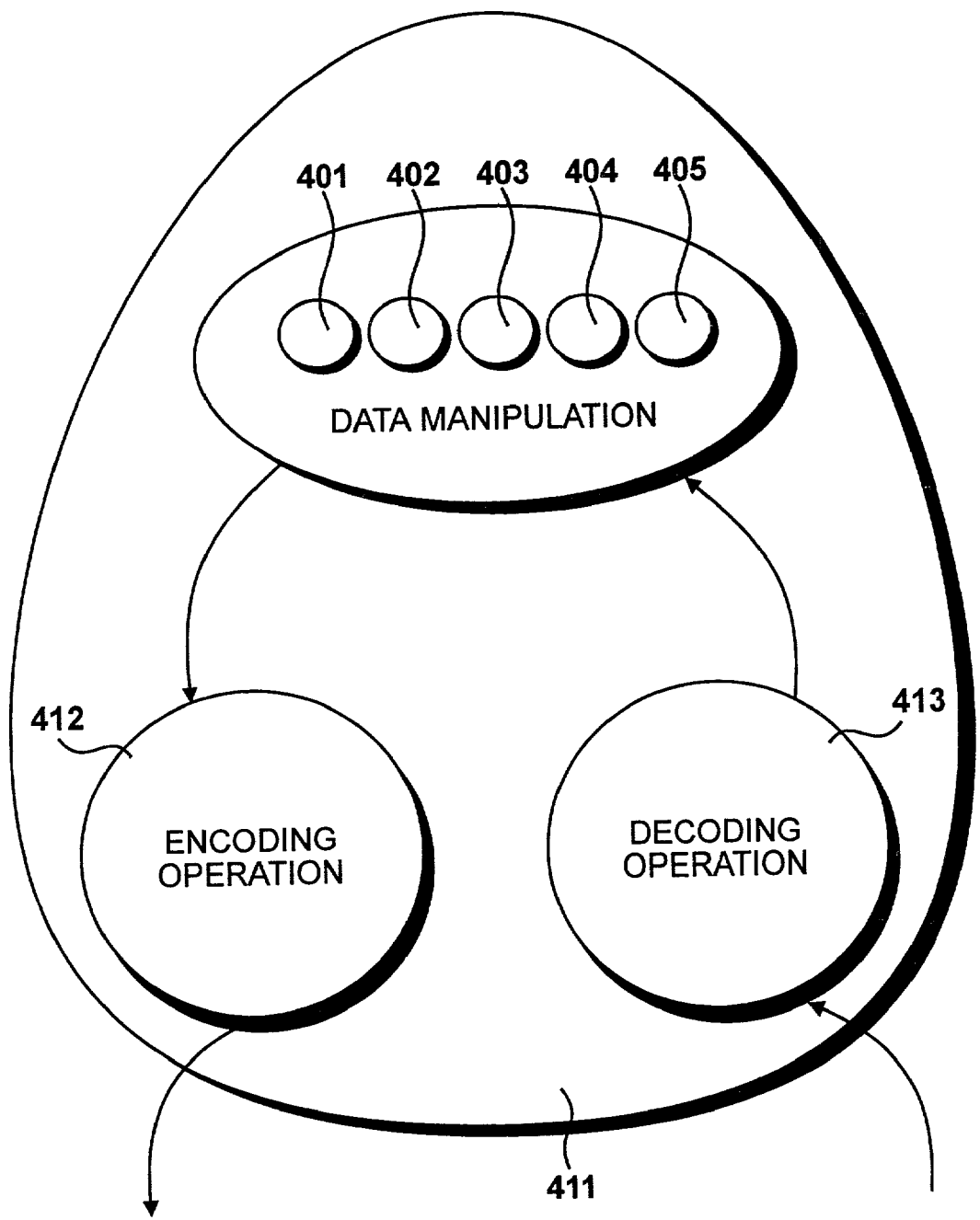
FIG. 4 shows procedures for an encoding operation performed by the system shown in FIG. 2.

The philosophy of the operating environment is illustrated in FIG. 4. The system includes a plurality of individual programs 401, 402, 403, 404, 405 etc that facilitate the manipulation of various types of data. Thus, for example, program 401 may relate to the creation and manipulation of animation data, program 402 may relate to the creation and manipulation of model data and program 403 may relate to the creation and manipulation of texture data. Once created in its original format, three-dimensional data is constrained within the environment as illustrated by boundary 411. It is possible for manipulated data to leave boundary 411 but it achieves this by being processed through an encoding operation 412. Thus, any data that does leave the system, by being written to a file or transmitted over a network, does so in encoded form after being processed by the encoding operation 412.

Similarly, encoded data may be received and is then manipulated by being processed through a decoding operation 413. The decoding operation 413 understands how to perform relevant decrypting processes that have been applied to data by an encoding process. The extent to which a user may then perform manipulations upon the decoded data is determined by the user's ability to identify access codes which themselves have been embedded within the encoded data.

Thus, data may be manipulated and then exported as part of an encoding operation. Similarly, coded data may be received, decoded and then manipulated as part of the decoding operation.

FIG. 5

Figure 5:
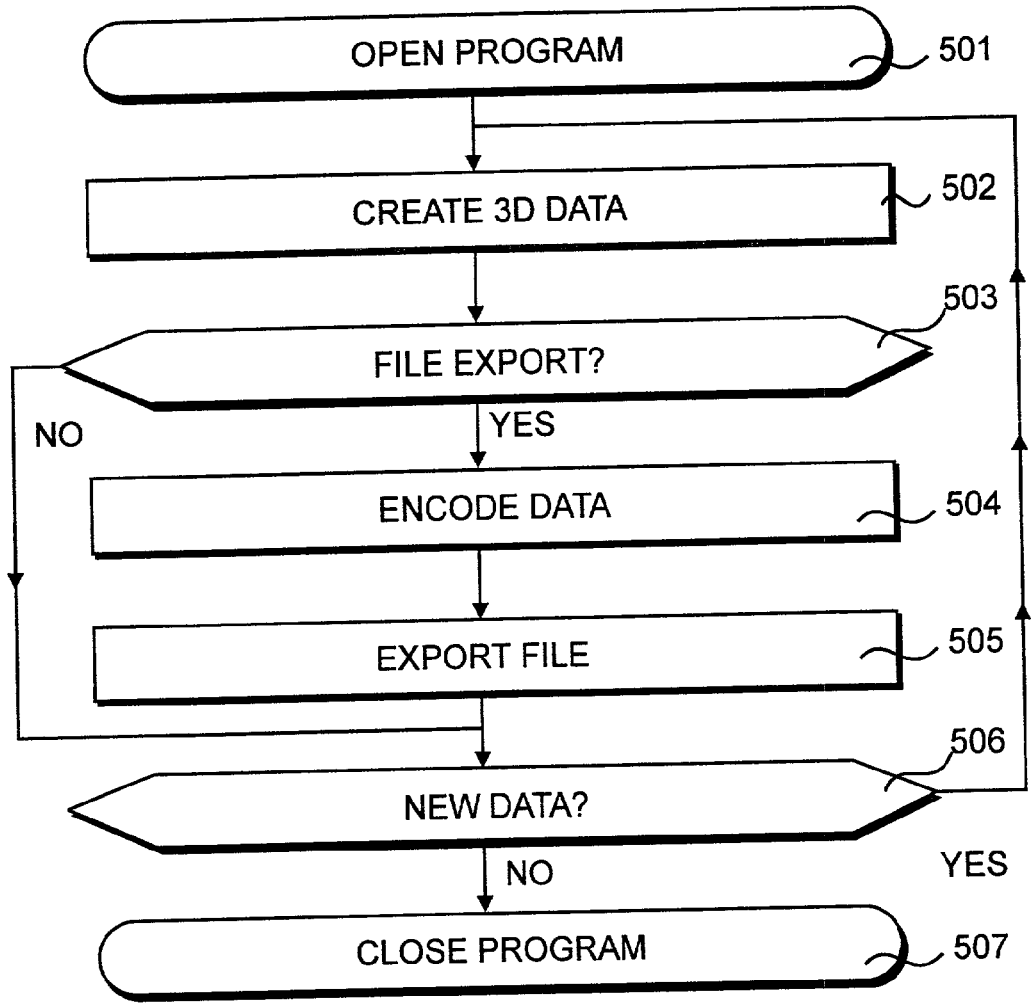
FIG. 5 shows procedures performed for an encoding operation.

Procedures performed by the system shown in FIG. 2 for an encoding operation are shown in FIG. 5. At step 501 the encoding operation program is opened and at step 502 mixed-media data is created. Procedures for creating and manipulating mixed-media data are well known and the exact nature of the processes performed at step 502 are not relevant to the particular nature of the present invention. However, it should be understood that the processes performed at step 502 result in the generation of three-dimensional data and other data types, that requires a further rendering process in order to produce viewable two-dimensional images.

At step 503 a question is asked as to whether a file is to be exported. The encoding operation performed by the system shown in FIG. 2 maintains local information in a secure form and does not allow general file copying. In order for a file to leave the system, either over a network connection or via recordable media, it is necessary for the file to be exported and as such the file undergoes an encoding process in order for the export to be completed. Consequently, if the question asked at step 503 is answered in the affirmative, the data is encoded at step 404 and then a file export is performed at step 505.

Thereafter, at step 506 a question is asked as to whether new data is to be considered. If the question asked at step 503 is answered in the negative, control is directed to step 506. If the question asked at step 506 is answered in the affirmative, control is returned to step 502 allowing further data to be created. If the question asked at step 506 is answered in the negative, the program is closed at step 507.

FIG. 6

Figure 6:
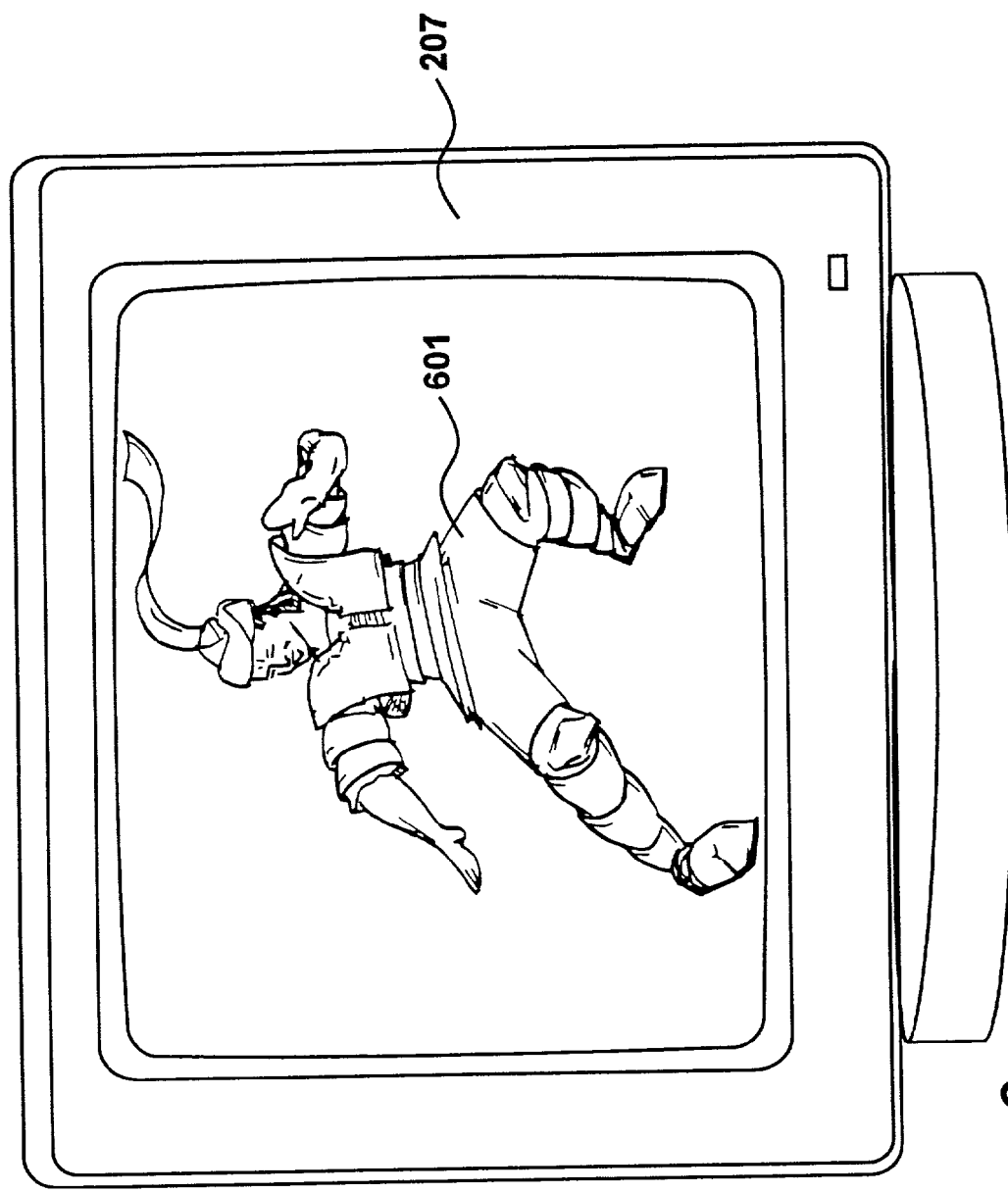
FIG. 6 illustrates a frame of an animation sequence.

Process 502 results in the creation of mixed-media data including three-dimensional data and a resulting three-dimensional animation may be viewed and on monitor 207, as shown in FIG. 6. In order for the three-dimensional data to be viewed, individual video frames are rendered and then displayed on the monitor 207. A model 601 appears to move on a frame-by-frame basis in response to data defining the animation to be performed. Consequently, the animation comprises data which may have been created by effects studio 103. Movement of the model 601 is defined by animation data and the animation data may have been created by animation studio 102. The model 601 appears solid with a outer surface or texture and separate texture data may have been generated by texture studio 104. Step 502 for the creation of three-dimensional data therefore involves the manipulation of the animation data, the model data and the texture data along with other modifiable parameters or user data to achieve the overall effect. Thus, elements may be defined by a user which may or may not be three dimensional, including texture or material values on polygon vertices.

FIG. 7

Figure 7:
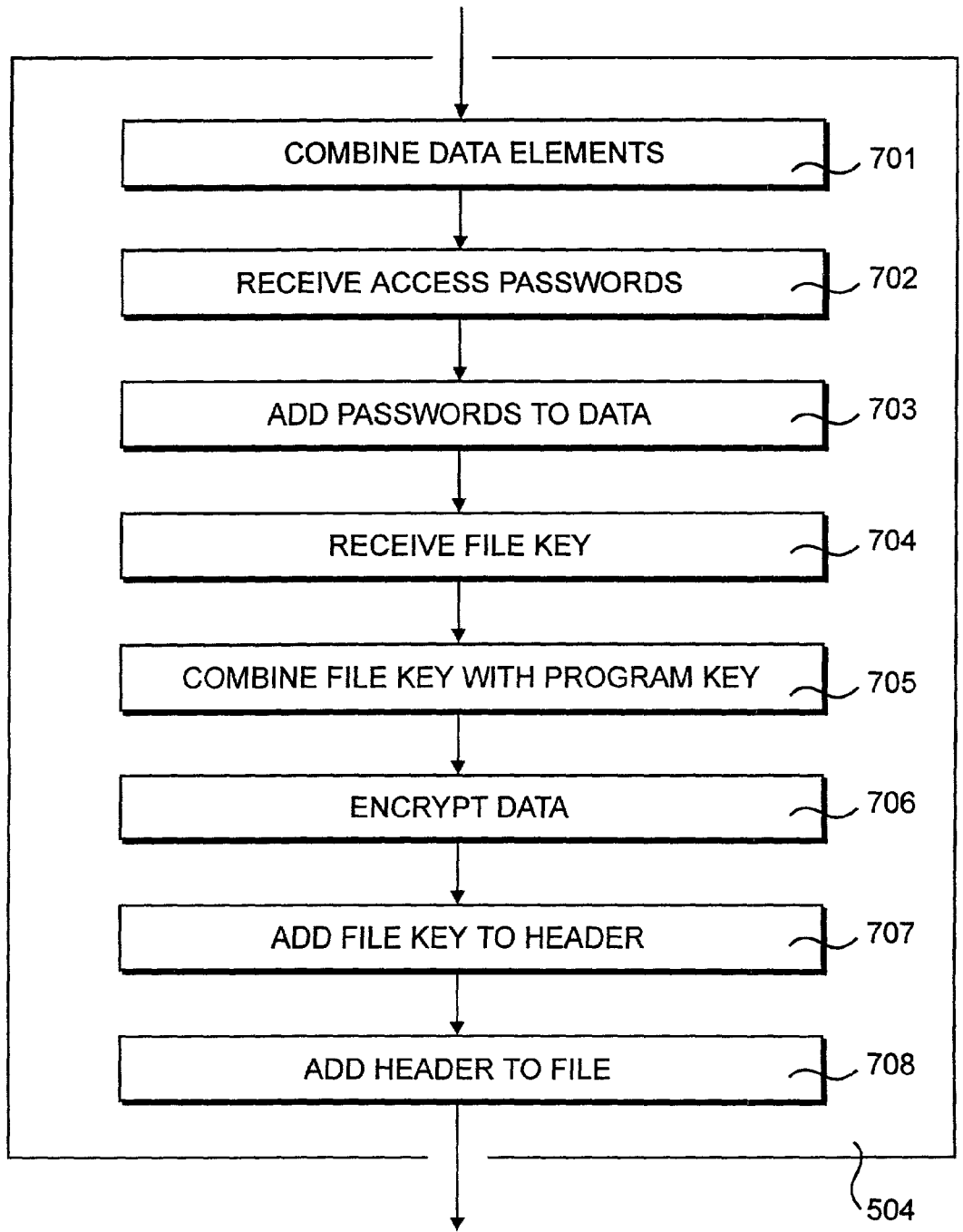
FIG. 7 shows details the encoding process shown in FIG. 5.

The encoding process 504 is shown in FIG. 7. At step 701 individual data elements, representing different types of data, are combined to form a single file which may then be encoded to produce an encoded file format that is recognisable by decoding processes.

Once received, the level of access made available to various components of the file is controlled by access codes; these being codes that are usually established by the original creator of the file. Thus, at step 702 the process receives access passwords and at step 703 the access passwords are added to the data.

At step 704 the process receives a file encryption key and at step 705 the file encryption key is combined with a program key; the latter being a key that is known to the program and is unique for each version of the program. These two keys are combined and then an encryption process is performed at step 706 on the basis of the combined key produced at step 705.

At step 707 the file key is added to a file header and then the header is added to the file itself at step 708 to produce a file that may be exported under process 505.

FIG. 8

Figure 8:
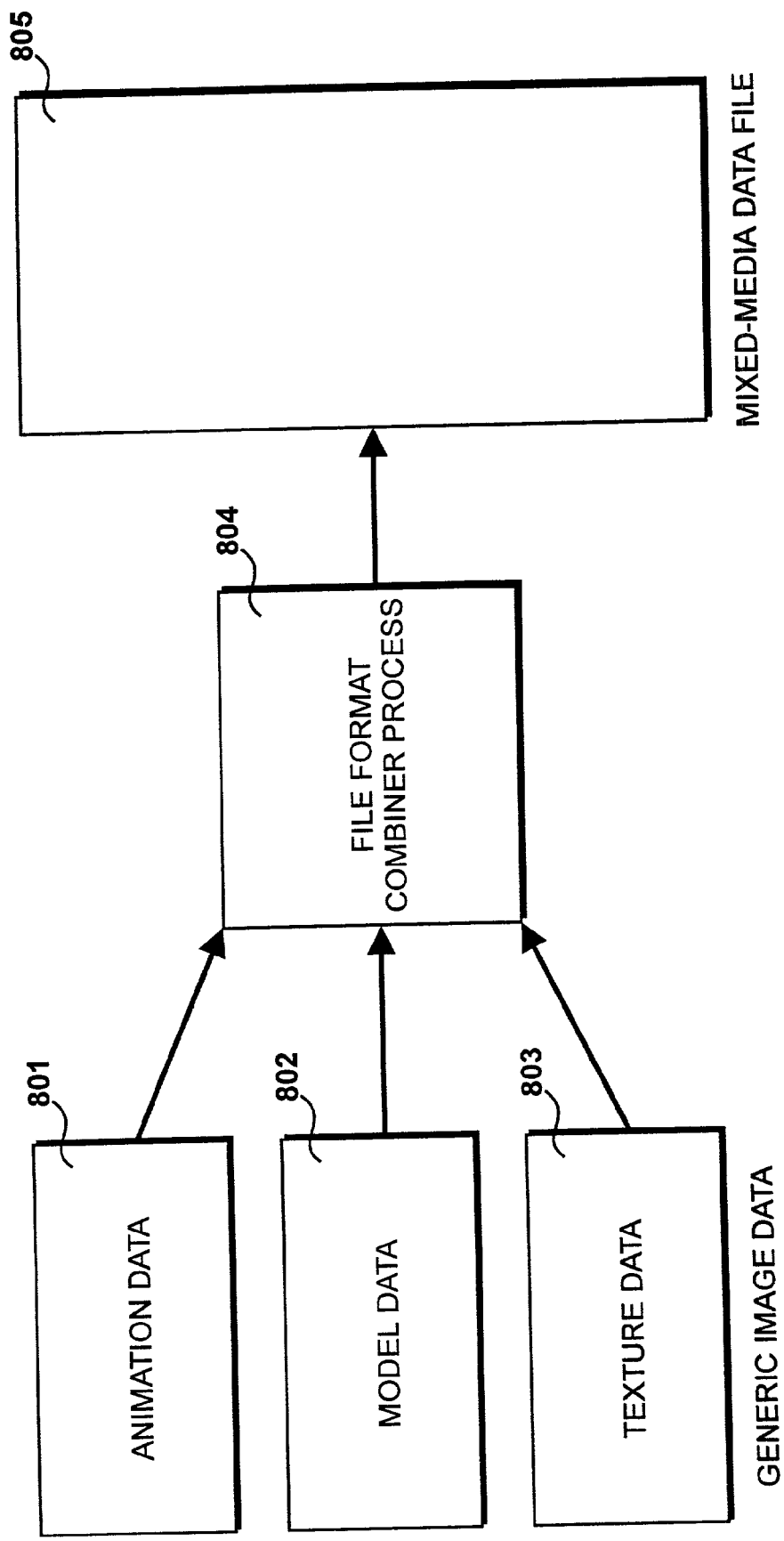
FIG. 8 details the process for combining data elements identified in FIG. 7.

Process 701 for the combining of data elements is illustrated in FIG. 8. In this example, animation data 801 has been produced and manipulated under the control of program 401. Similarly, model data 802 has been produced and manipulated under the control of program instructions 402 and texture data 803 has been produced and manipulated under the control of program 403. The data sets 801, 802 and 803 are relevant to the particular type of data being produced. A file format combiner process 804 provides, in combination with the system hardware, a means for combining these data formats into a combined binary file identified as a mixed-media file 805.

FIG. 9

Figure 9:
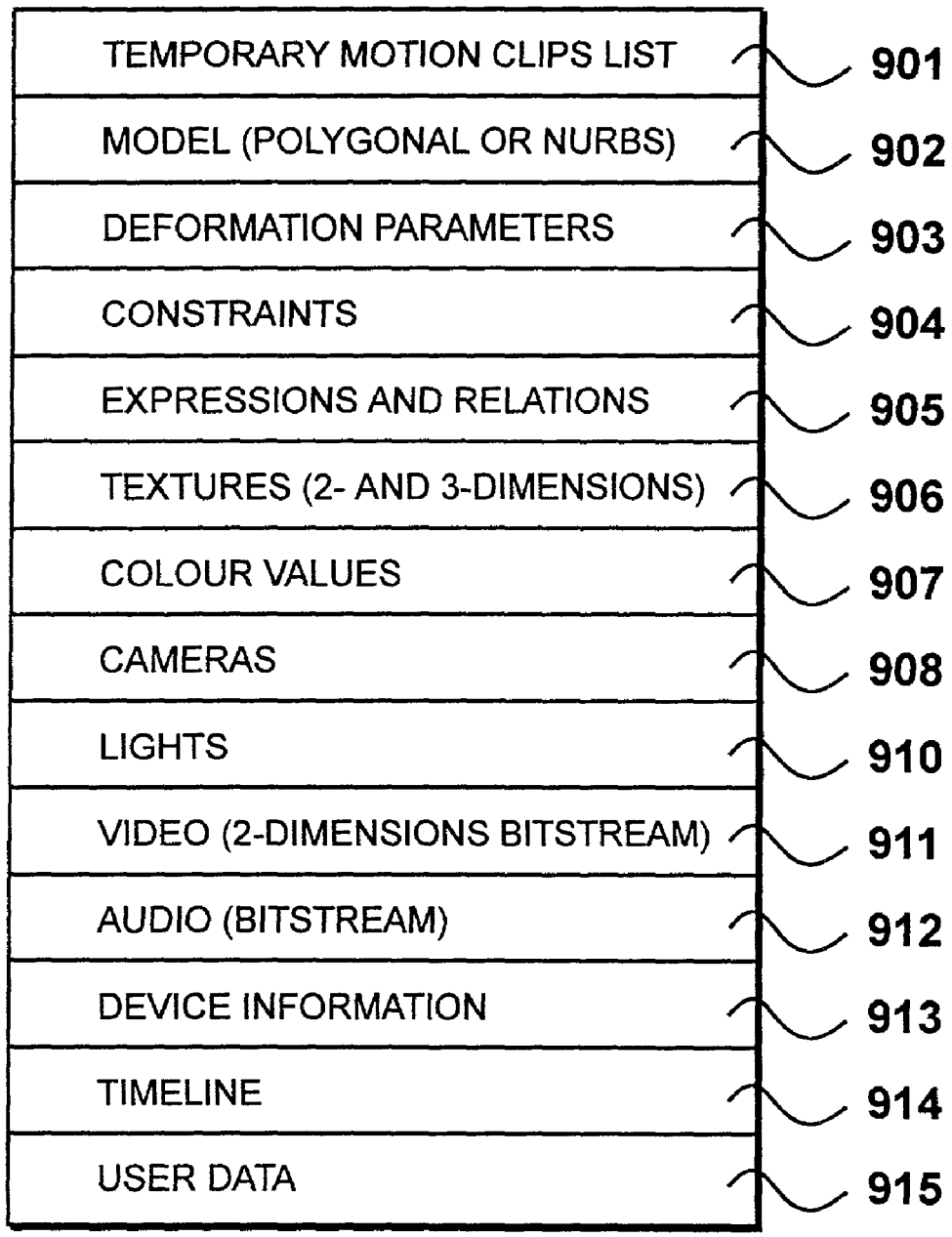
FIG. 9 illustrates a detailed example of the three-dimensional data file.

A detailed example of a mixed-media file is illustrated in FIG. 9. At 901, the file includes binary data relating to the animation. An animation is created by combining animation data with model data such that a specified model effects movement in accordance with the specified animation.

Model data is stored at 902 and this may be defined in terms of polygons or splines.

At 903 deformation parameters are stored that define the weight relationship between three dimensional elements, such as between a skin and an inverse kinematics bone of an animation model.

At 904 constraints data is stored defining the relationship between objects or elements.

At 905 expressions and relations are stored in the form of mathematical relationships between objects and elements.

At 906 textures, in the form of two-dimensional images or three-dimensional geometric deformations based upon procedural algorithms are stored.

At 907 colour values are stored with definitions of cameras being stored at 908 and definitions of lights being stored at 910.

Location 911 provides for the storage of video clips, taking the form of two-dimensional bit streams. Similarly, at 912 there is the provision for the storage of audio bit streams. Device information such as parameter controls for input and output devices are stored at 913 and timeline information is stored at 914. In addition, user defined data is stored at 915.

FIG. 10

Figure 10:
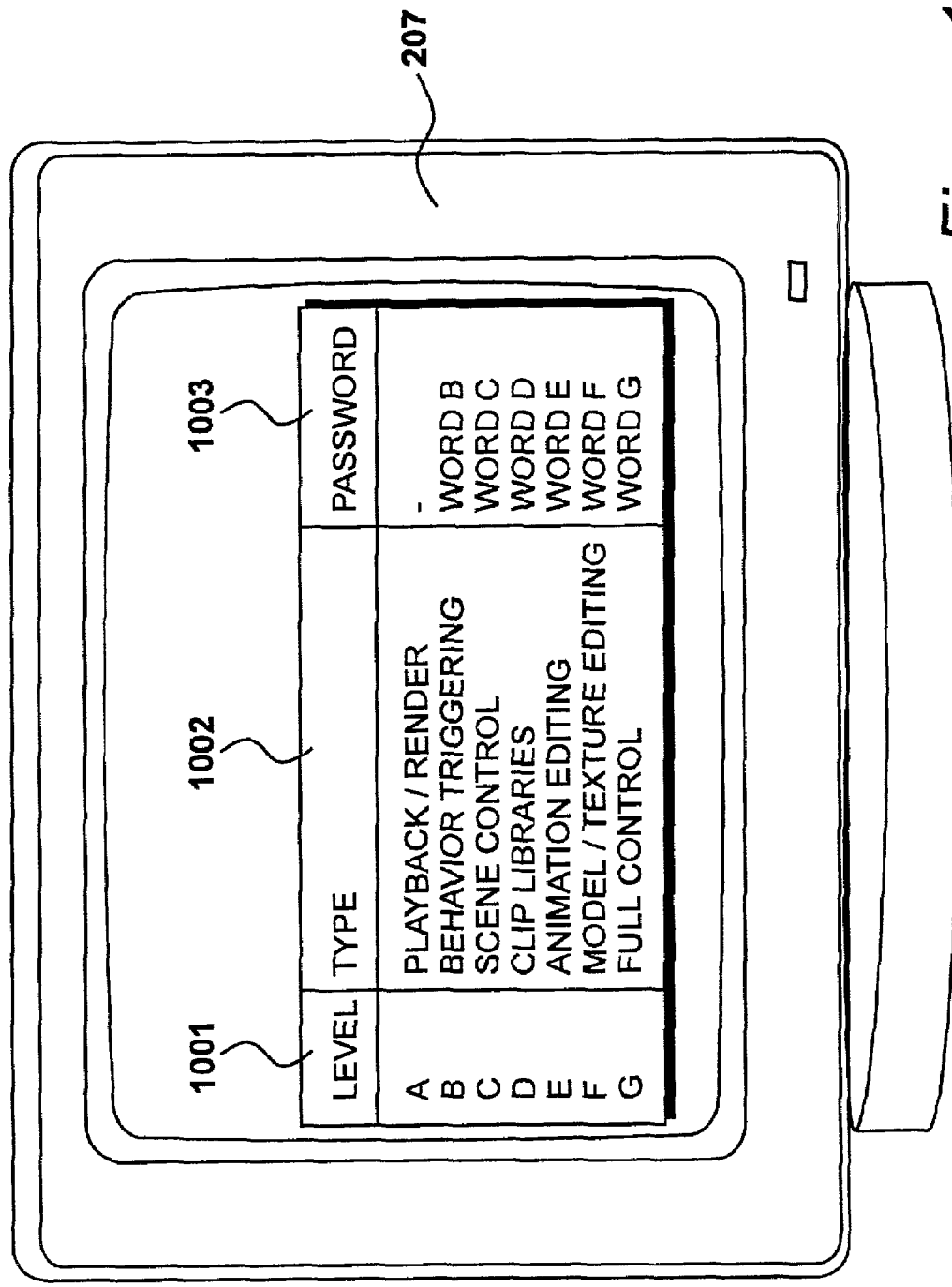
FIG. 10 shows a table for the definition of passwords.

After the individual file elements have been combined by process 804 to produce a mixed-media data file 805 access passwords are received at step 702. The passwords are received in response to a table being displayed on monitor 207 as illustrated in FIG. 10. The table shown in FIG. 10 is presented to an originator in order to specify the passwords for particular levels of access. In this respect, the program may be provided in two forms. In a first form, as disclosed with respect to the present embodiment, the levels of access are predefined.

Thus, in the first embodiment, a complete system is provided in which levels of access are pre-specified. However, in an alternative environment, the essential components of a system could be licensed to a commercial vendor, thereby allowing said vendor to define their own levels of access that are consistent with their own distribution procedures and format.

In the present example, seven levels of access are provided as shown in column 1001. Column 1002 identifies the type of access associated with each level and, in the enhanced embodiment, the specific type of access provided at each level may be specified by the originator. Column 1003 then provides for a password to be identified for each particular level.

In this example: Level A provides for the rendering and playback of three-dimensional data so as to produce two-dimensional output. Usually, there is no problem in terms of allowing this level of access therefore it would be usual to leave the password entry blank.

Level B access allows behaviour triggering to be modified and is secured by password "WORD B". Level C access allows scene control and is protected by password "WORD C". Similarly, level D access allows clip libraries to be modified, protected by password "WORD D" and Level E allows animation to be edited, accessed by password "WORD E". Similarly, Level F allows model editing and texture editing to be performed, protected by password "WORD F" and Level G allows full control to the data, protected by password "WORD G". The passwords are selected by the originator and would tend to change on a file-by-file basis. As is well recognised in the art, it is appreciated that a greater level of security is obtained by allowing larger passwords to be entered.

Knowledge of a password for a certain level provides automatic access to all of the lower levels. Consequently, if the user is aware of password "WORD F" it is not necessary to know passwords "WORD B" and the others between these extremes.

In addition to crescive level access, in which each progressively secure level provides an augmented level of access with access to the preceding levels also being available, the access may be discrete, such that individual levels may be accessed without access to the other levels. Such a discrete approach is applicable in situations where, for example, modifications are to be made to a texture in a particular studio where only access to the texture controls is only required. Thus, using this discrete approach, it would be possible to provide access to these control while not permitting access to other, often simpler elements of the scene.

FIG. 11

Figure 11:
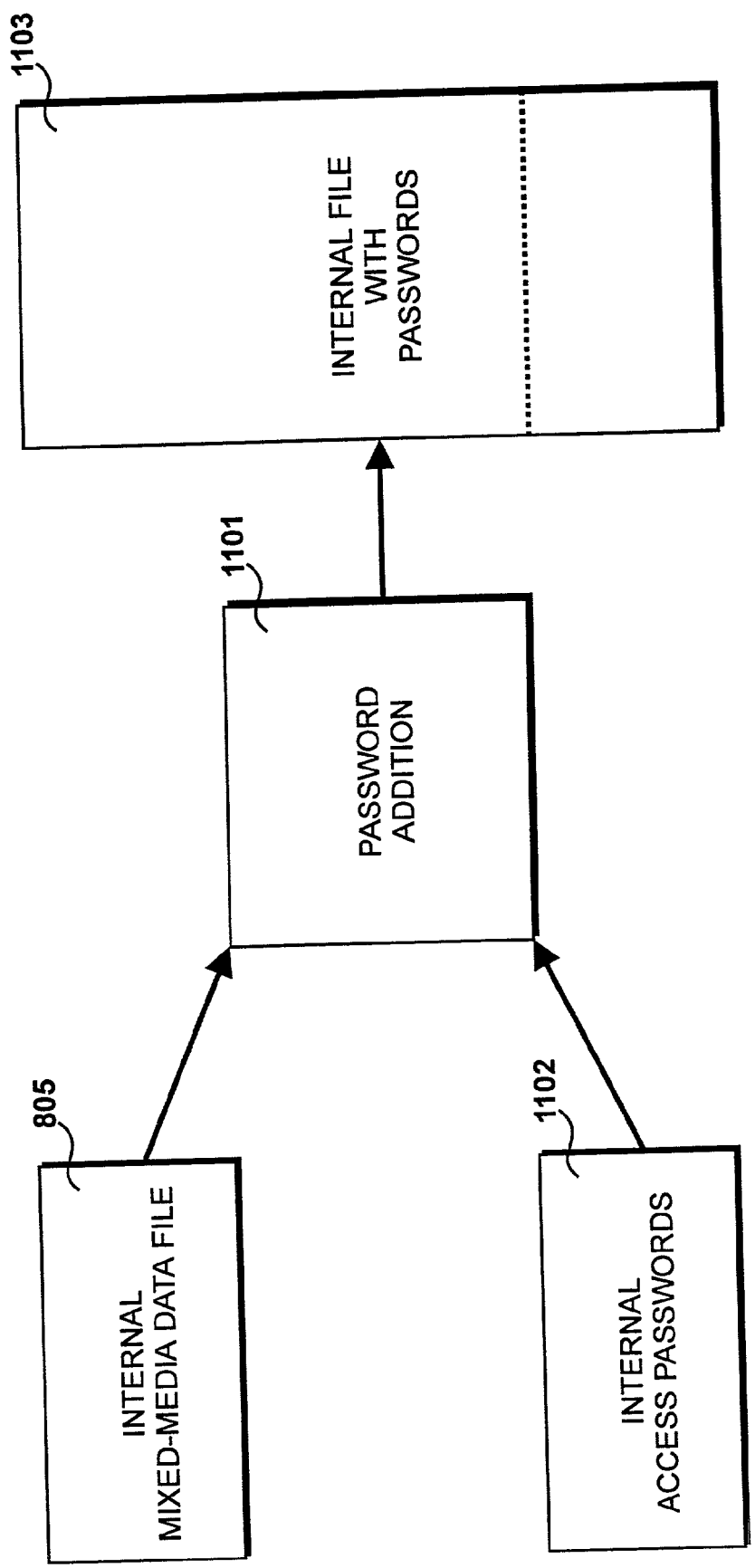
FIG. 11 illustrates the procedure for adding passwords identified in FIG. 7.

After the passwords have been specified, under control of process 702, the passwords are added to the three-dimensional data at process 703. Procedure 703 for the addition of passwords is illustrated in FIG. 11. The password addition process 1101 provides, in combination with the system hardware shown in FIG. 2, a means for combining the internal three-dimensional data 805 with internal access passwords 1102 defined in the table shown in FIG. 10. The password addition process 1101 performs a data concatenation to produce an internal file with passwords 1103.

After the internal file with passwords has been created, a file key is received at step 704. This file key is specific to the new file, thereby ensuring that a key providing access to one file would not automatically provide access to other similar files. The key may be specified manually by a user and in this example is made up of four bytes. Alternatively, the key may be generated by the program itself or read from a file containing a plurality of possible keys.

FIG. 12

Figure 12:
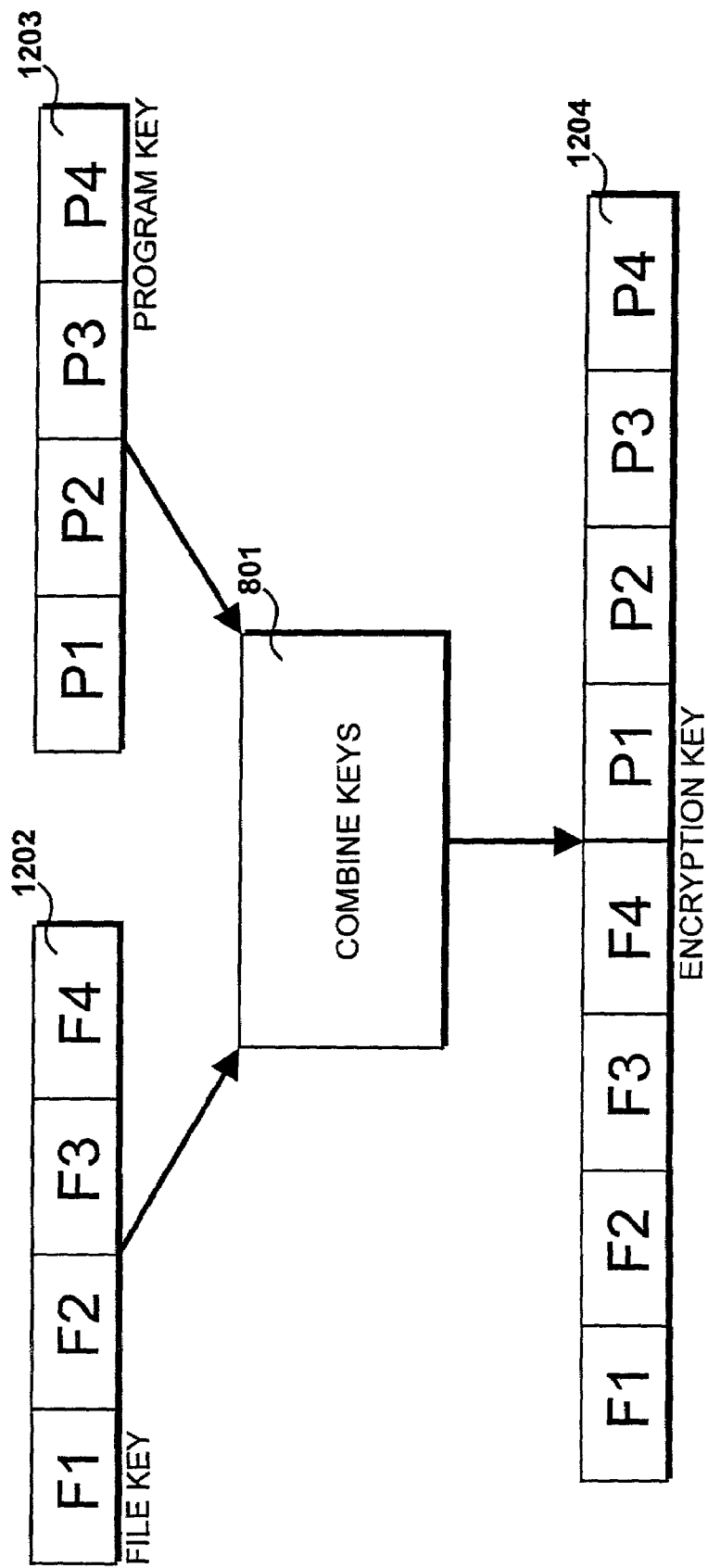
FIG. 12 illustrates the process for combining keys identified in FIG. 7.

Having received the file key at step 704, the file key is combined with the program key at step 705. The program key is known internally to the program itself and it is envisaged that new versions of the program would have different internal program keys. Referring to FIG. 12, a combine key process 1201 provides, in combination with the system hardware shown in FIG. 2, a means for combining a file key 1202 with the program key 1203 to produce an encryption key 1204.

Figure 13:
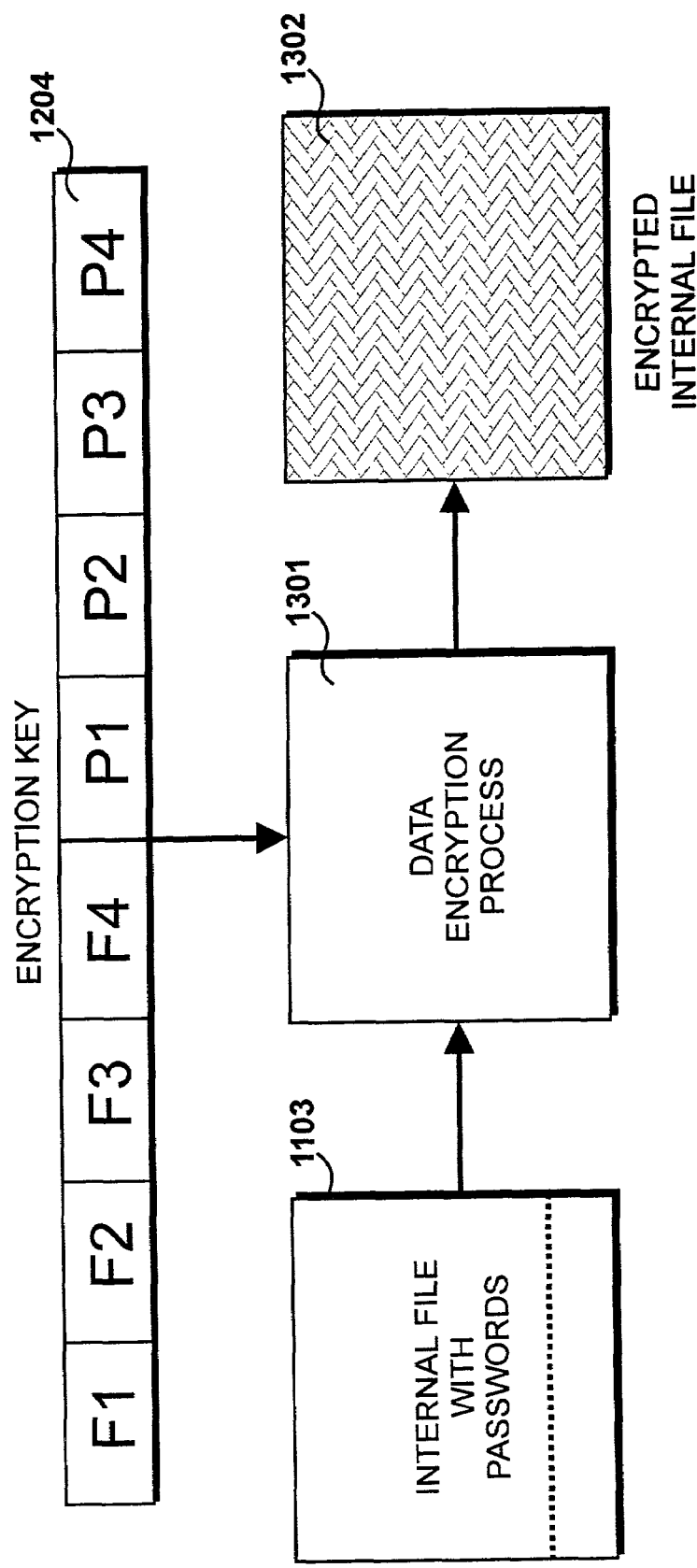
FIG. 13 illustrates the data encryption process identified in FIG. 7.
Figure 14:
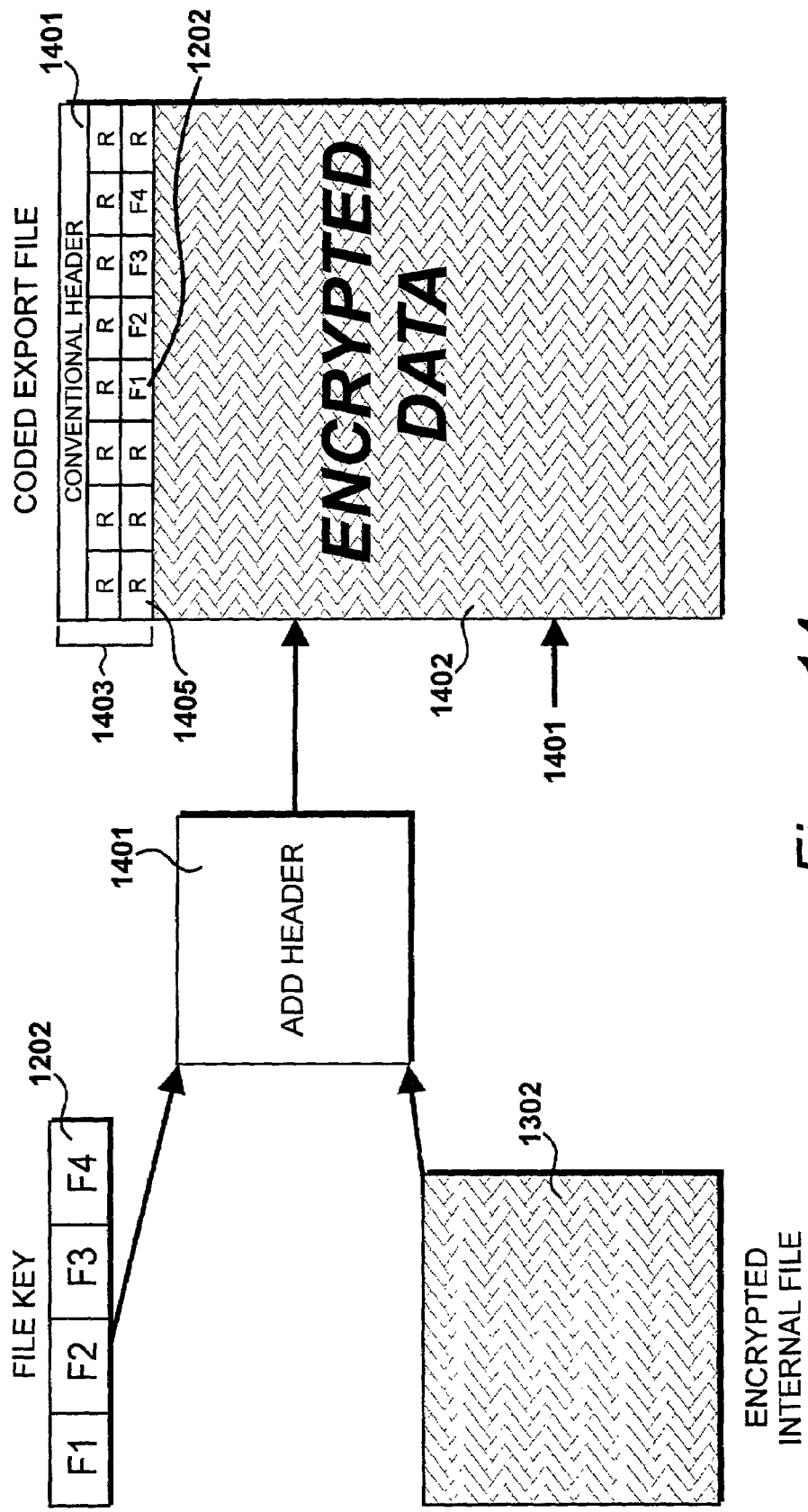
FIG. 14 illustrates the header creation and addition processes identified in FIG. 7.

Process 706 for encrypting the internal file is illustrated in FIG. 13. As is well known in the art, an encrypting process takes plain text (machine-readable binary data in this example) and processes this plain text, with reference to a key in order to produce cipher text. The cipher text can then be converted back to the plain text without loss either by using the same key that was used for encryption or by using a different key, depending upon the type of encryption being employed.

The particular type of encryption being performed is not relevant to the present invention, provided that the encryption provides a suitable degree of protection. Presently, the art suggests that a private key consisting of two hundred and fifty-six bits could not be broken in a realistic time scale through brute force alone. However, it is appreciated that advances continue to be made and key size would need to be reviewed when new versions of the program software are released.

A suitable form of encryption for the present purpose is considered to be that made available under the designation "Twofish".

Further details concerning Twofish cipher may be found at http://www.counterpane.com/twofish.html. Twofish is a one hundred and twenty eight bit block cipher that accepts a variable length key up to two hundred and fifty six bits. The cipher is a sixteen round Feistel network with a bijective F function made up of four key dependent eight by eight S boxes, are fixed four by four maximum distance separable matrix, a Pseudo-Hademarde transform, bytwise rotations and a carefully designed key schedule.

Twofish is a one hundred and twenty eight bit block cipher that accepts a variable length key up to two hundred and fifty six bits. The cipher is a sixteen round Feistel network with a bijective F function made up of four key dependent eight by eight S boxes, are fixed four by four maximum distance separable matrix, a Pseudo-Handemarde transform, bytwise rotations and a carefully designed key schedule.

FIG. 13

As illustrated in FIG. 13, the internal file with passwords 1103 is provided to the data encryption process 1301, the data encryption process 1301 also receives the encryption key 1204 and performs an encryption process to produce an encrypted internal file 1302.

In this example, encrypted data is illustrated as being shaded. It is not possible to perform any manipulations with respect to the encrypted data until this data is decrypted by means of a decryption process performing the opposite process to that performed by the data encryption process 1301. The encrypted file written back to disc is a binary file.

FIG. 14

Process 707 adds the file key to the header and process 708 then adds the header to the file. These steps are performed by an add header process 1401, which, in combination with a system hardware, provides means for effecting the combination of the file key to the header and then the addition of the header to the encrypted internal file.

It is only the file key 1202 that is included in the header, given that the program key 1203 will be known to the program executed by the receiving equipment.

Consequently, the encrypted internal file 1302 has a header added thereto and said header includes the file key 1202.

A resulting coded export file is identified at 1401. This includes the encrypted data 1402 and the header 1403. The header 1403 includes a conventional header 1404, the file key 1202 and a plurality of random entries 1405. The purpose of the random entries 1405 is to further camouflage the presence of the file key thereby by making its extraction more difficult except for legitimate holders of the program.

The conventional header 1404 includes an identification showing that the file is binary file and an identification of the file version. In addition, the header includes identification of the version of the program used for its creation and a flag that may be set or unset but when set confirms that the remainder of the file has been encrypted.

FIG. 15

Figure 15:
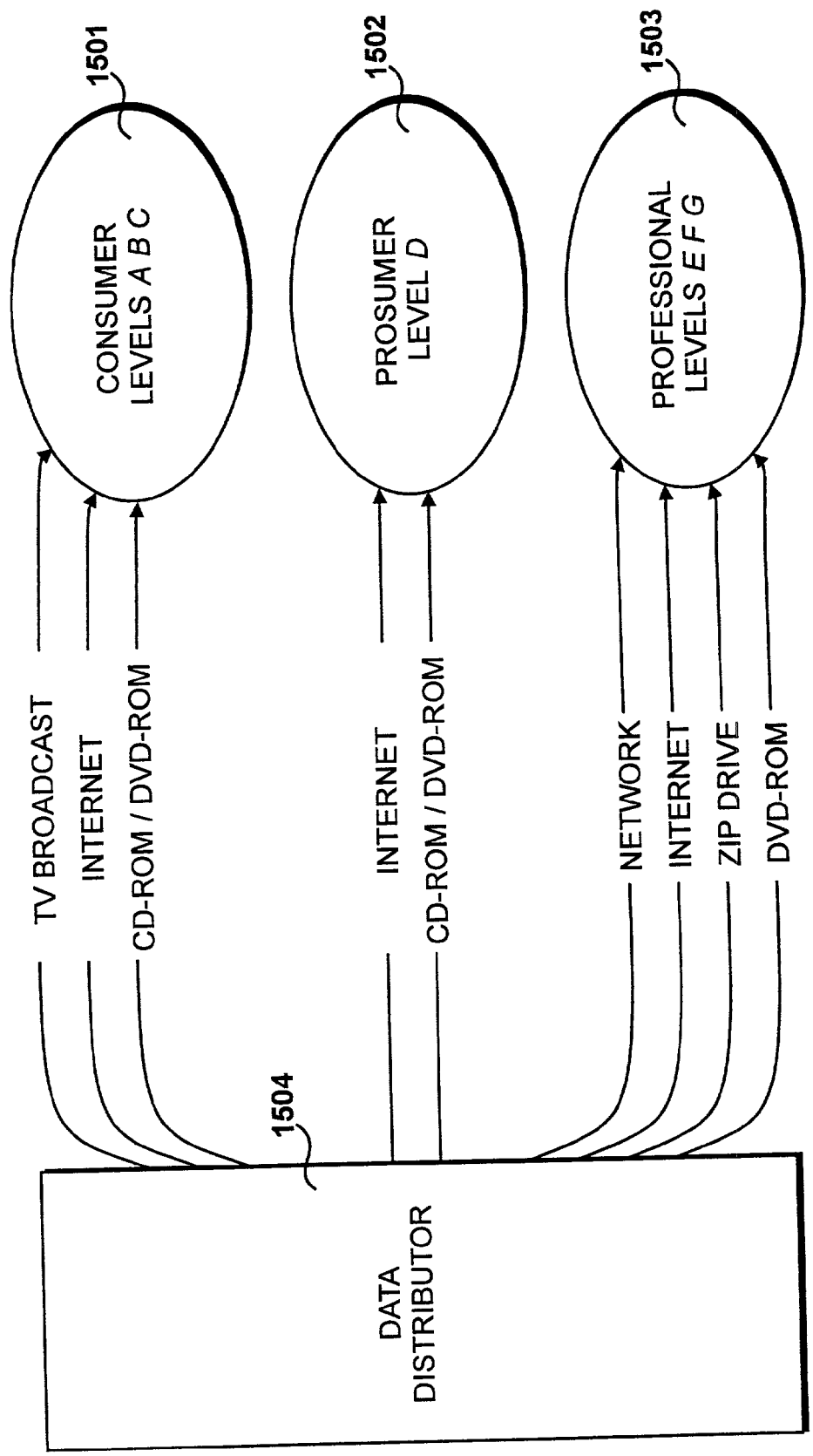
FIG. 15 illustrates distribution modes for a coded export file.

The coded export file 1401 is now available for distribution, as shown in FIG. 15. The export file is distributed to consumers 1501, prosumers 1502 and professionals 1503. In theory, anyone can receive encrypted files from any source but in most cases consumers would receive files over the Internet or by data carrying media such as CD ROMS and DVDs. Similarly, prosumers receive files from data distributors, such as data distributor 1504 via the Internet or via CD ROMS and DVDs etc.

Professionals, who may be in-house professionals, receive data via internal networks, via the Internet, using re-writable media such as zip drives and by using read-only media such as DVDs.

Different levels of access are usually given to different types of recipients. Thus, in this example, consumers 1501 are given access to Levels A, B and C. However, it is expected that consumers having access to Level B will have to make some payment and to be given access to Level C a higher payment would be required.

A further payment would be made by prosumers, thereby giving them access to Level D. Professionals assisting in the development of a project would require access to Levels E, F or G as considered appropriate.

Figure 16:
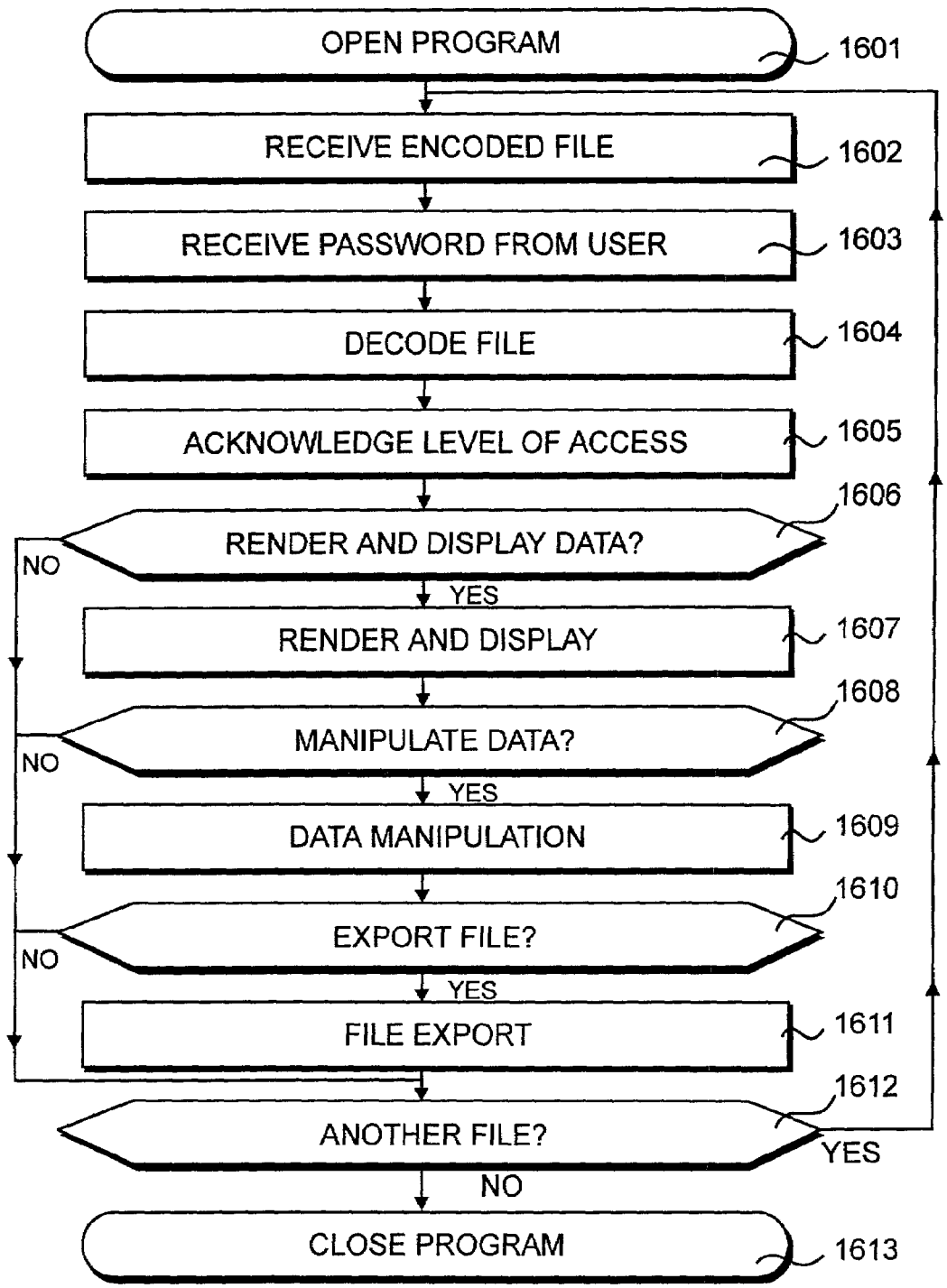
FIG. 16 illustrates a decoding operation.

After receiving a file from a data distributor or a colleague, it is necessary to perform a decoding operation 413 in order to effect further data manipulation. In this example, animation studio 102 has generated a protected file that has been supplied to effects studio 103. Further manipulations have been performed by the effects studio 103 and a protected file has then been returned back to the animation studio 102 and in particular to the station illustrated in FIG. 2. The station in FIG. 2 will now be described with respect to the performance of the decoding operation 413, as illustrated in FIG. 16.

FIG. 16

At step 1601 the program is opened and at step 1602 the encoded file is received. At step 1603 the receiving user enters the password which would either be WORD B, WORD C, WORD D, WORD E, WORD F or WORD G depending on the level of access afforded them. In this example, the file has been returned back to the animation studio 102 so the user would enter WORD G. Had the file been received at the customer centre 105 no password would be entered but only Level A access would be obtained. Had the file been sent to the texture studio 104, the user would enter WORD F and would not be capable of gaining the full control of Level G.

At step 1604, the file is decoded and at step 1605 the level of access is acknowledged to the user.

At step 1606 a question is asked as to whether the data is to be rendered and displayed which would usually be answered in the affirmative, particularly given that a password is not required in order to achieve this. Consequently, the data is rendered and displayed at step 1607.

At step 1608 a question is asked as to whether the data is to be manipulated and this question may be answered in the negative if the user does not have a level of access above Level A. Assuming a user does have access above Level A, the question asked at step 1608 is answered in the affirmative allowing data manipulation to be performed at step 1609.

At step 1610 a question is asked as to whether a file is to be exported, ie requiring the encoding operation 412 and if answered in the affirmative, a file is exported at step 1611. If a user does not have access above Level A, it is not possible for the question asked at step 1610 to be answered in the affirmative thereby such users cannot export files.

If any of questions 1606, 1608 and 1610 are answered in the negative, control is directed to step 1612 where a question is asked as to whether another file is present. If answered in the affirmative, control is returned to step 1602 alternatively control is directed to step 1613 and the program is closed.

FIG. 17

Figure 17:
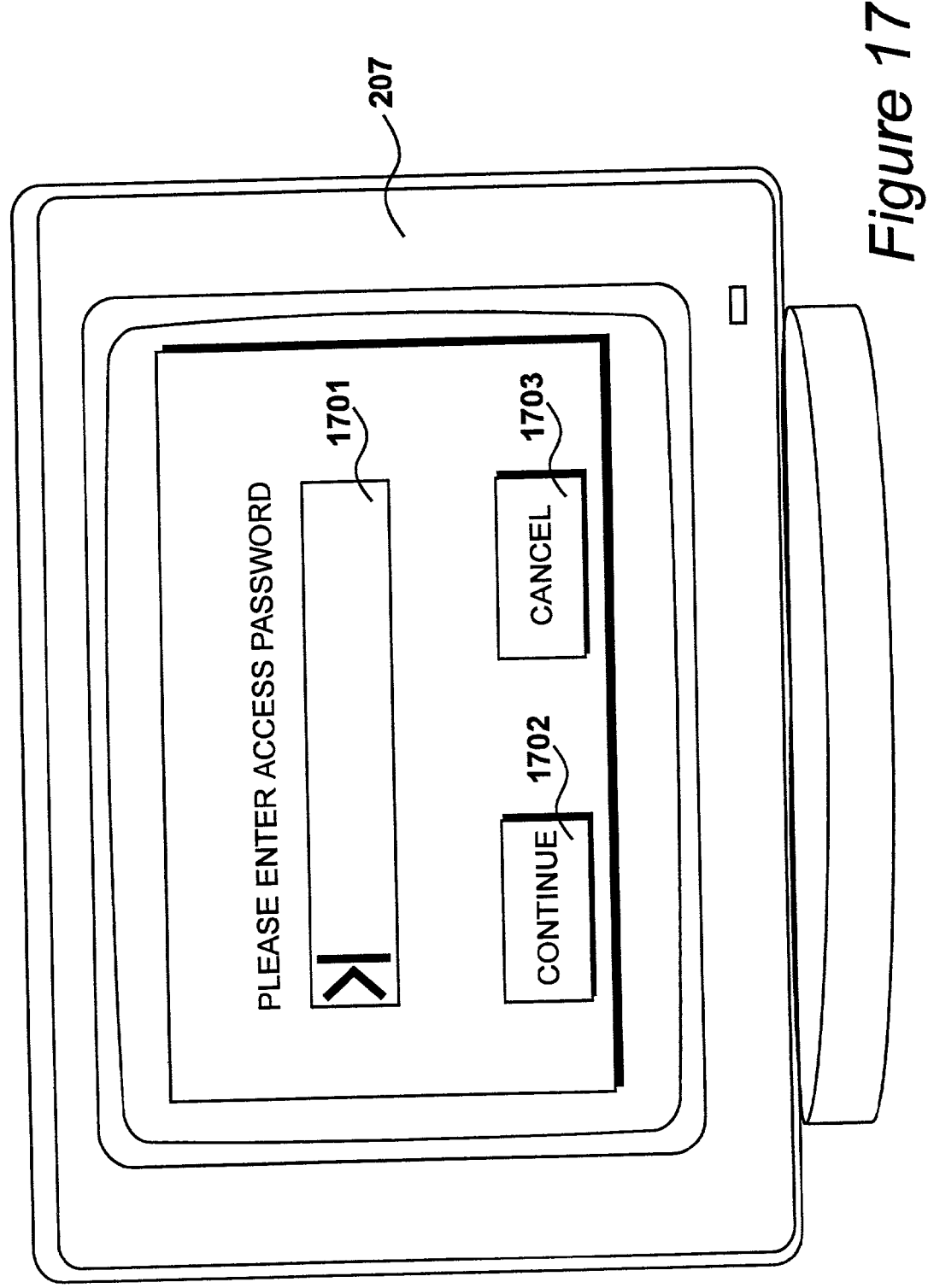
FIG. 17 illustrates a display requesting a password to be entered.

Step 1603 invites a user to enter a password, resulting in an invitation being displayed on monitor 207, as illustrated in FIG. 17. A user is invited to enter a password in text box 1701 and then effect a pressing of soft button 1702 to continue or button 1703 to cancel.

FIG. 18

Figure 18:
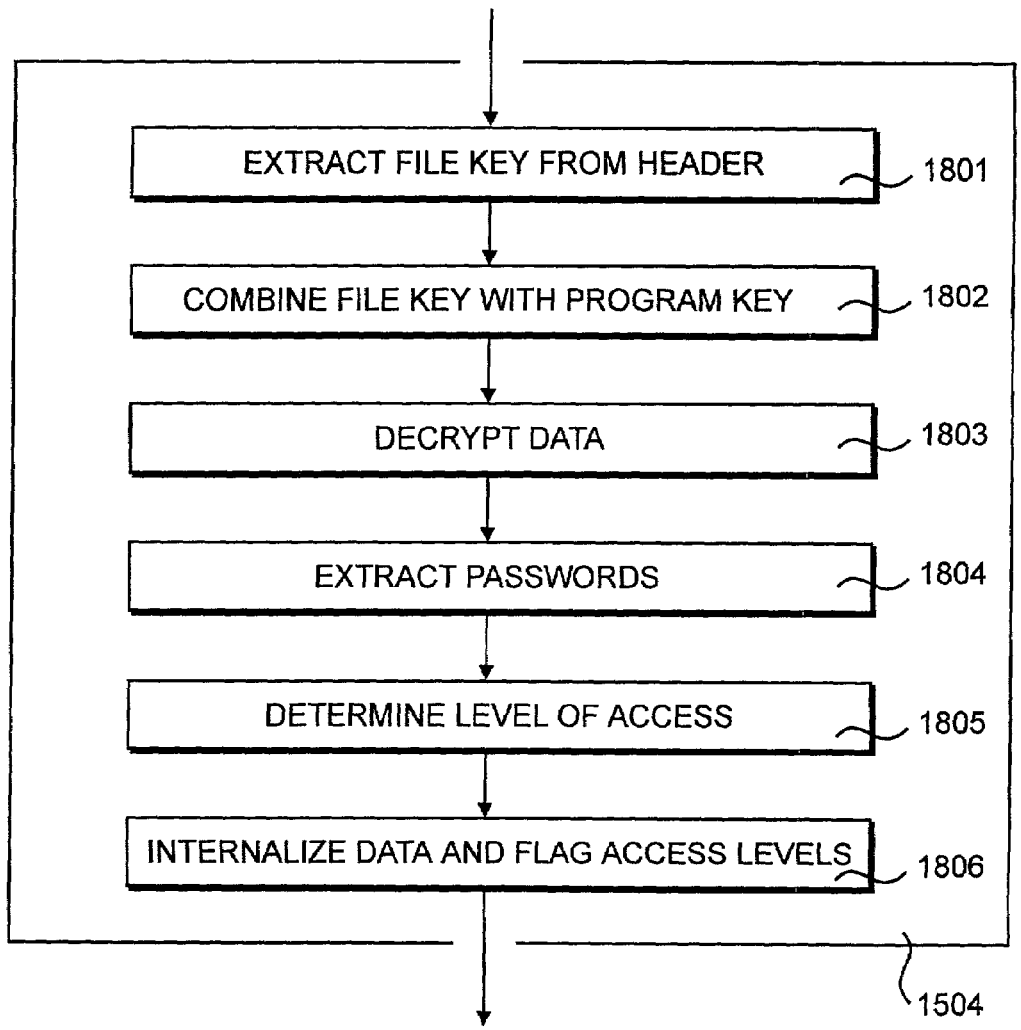
FIG. 18 details the process for decoding an encoded file identified in FIG. 16.

Process 1604 for the decoding of an encoded file is detailed in FIG. 18. At step 1801 the file key is extracted from the header, given that the decoding operation 413 is aware of the location of the file key bytes within the header.

At step 1802 the file key is combined with the program key; again the decoding operation 413 being aware of the program key.

At step 1803 the data is decrypted by means of a process performing the reverse operation to encryption process 1301.

At step 1805 the level of access available to a user is determined by comparing the access password entered at step 1603 with passwords stored within the decrypted file.

At step 1806 the decrypted data is internalised and access level flags are set. Thus, process 1806 represents the data being transferred from the decoding operation 413 to the data manipulation region that includes manipulation programs 401 to 405 etc. The individual data elements are also considered independently as such allowing appropriate programs to be operated upon each one of them independently.

FIG. 19

Figure 19:
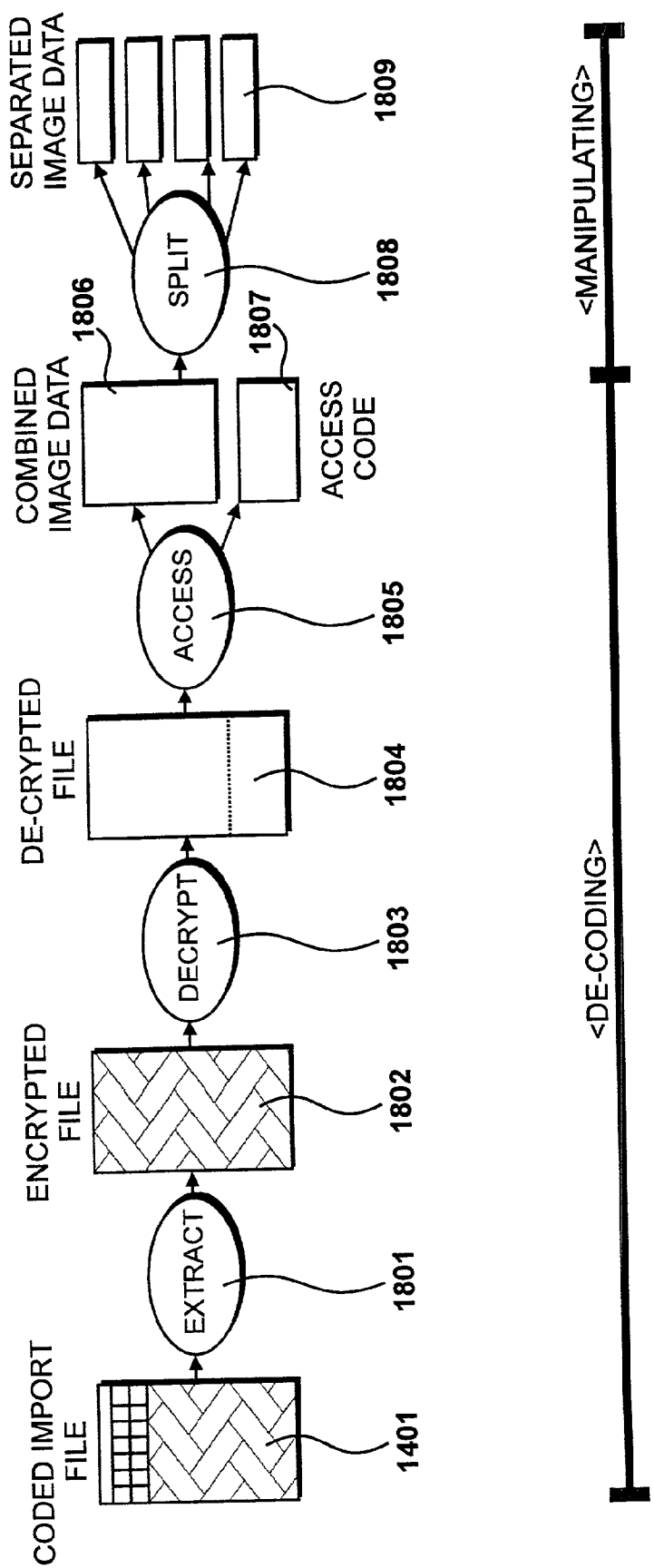
FIG. 19 illustrates the overall process for receiving an encoded file.

The overall process for receiving an encoded file and then acting upon it is illustrated in FIG. 19. Extraction process 1801 provides, in combination with the system hardware, means for receiving coded import file 1401 and producing an encrypted file 1802, similar to encrypted internal file 1302.

Decryption process 1803, in combination with the system hardware, provides means for decrypting encrypted file 1802 to produce a decrypted file 1804, being an internal file with passwords similar to file 1103.

Access process 1805 provides, in combination with the system hardware, means for receiving a decrypted file 1804 and producing a combined image data file 1806, similar to file 805 along with access codes 1807, similar to codes 1102.

A combination of processes 801 to extract, 1803 to decrypt and 1805 to access may be considered in combination as the decoding operation.

Process 1807 splits the combined data 1806 into its individual elements 1808, similar to elements 801, 802 and 803. Once placed in this form, it is then possible for manipulations to be performed, dependent upon the level of access provided by the access codes 1807 and the user's ability to enter an access password.

FIG. 20

Figure 20:
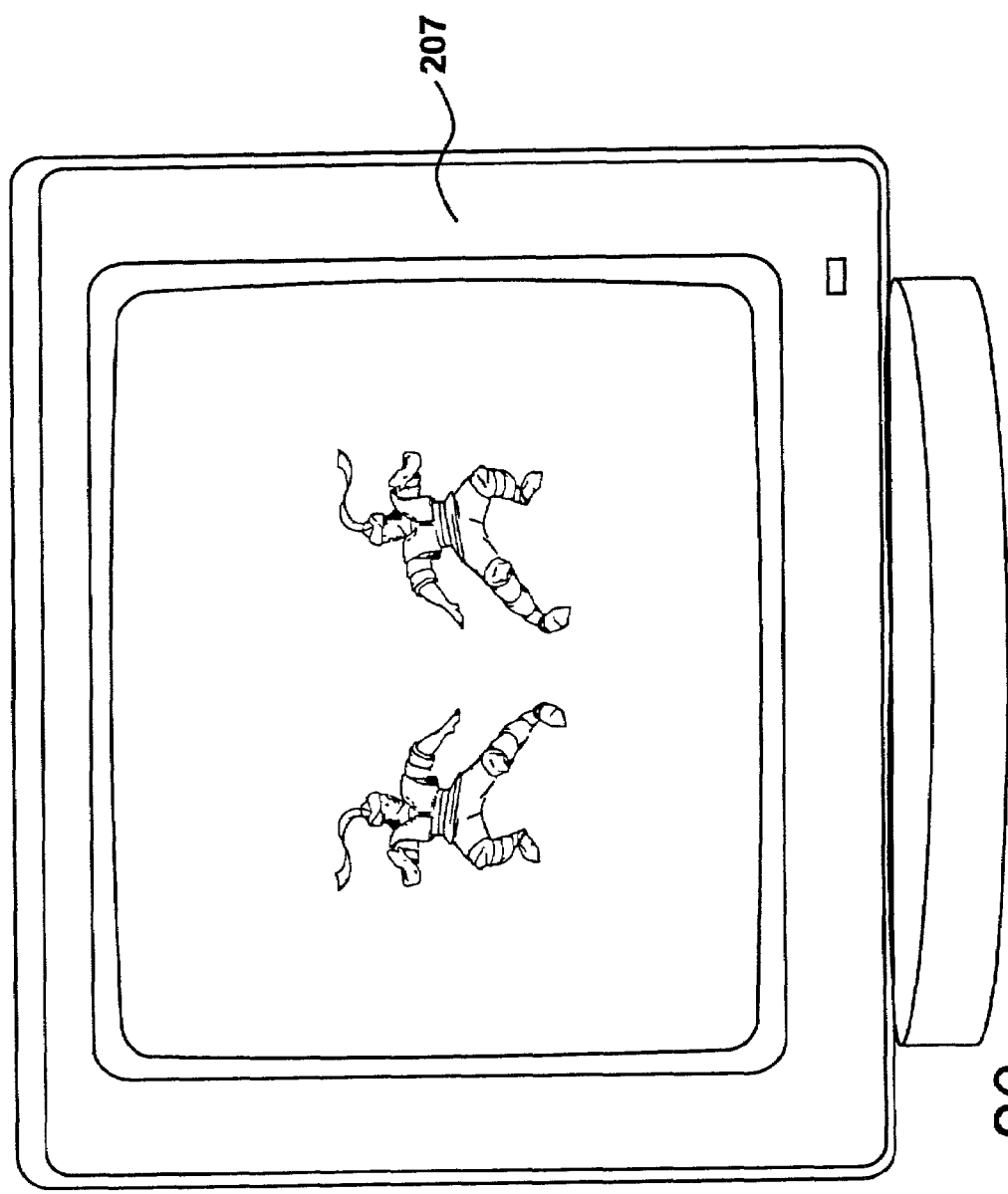
FIG. 20 illustrates a frame of an animation generated from the received animation data.

Having performed the decoding operation, the animation studio 102 is then in a position to review the work done by studio 103 and make further manipulations. Consequently, the mixed-media data is rendered and displayed on monitor 207, as illustrated in FIG. 20. Thus, as shown in FIG. 20, further manipulations have been made to the original data, as displayed in FIG. 6 and, with a requisite level of access, it is now possible for the animation to perform further manipulations and possibly complete the project. Thereafter, three-dimensional data may be released and distributed as illustrated in FIG. 15 but with different types of user being allocated appropriate access codes thereby ensuring that anyone who has not been given permission to access appropriate levels of the data are prevented from doing so.

What we claim is:

1. Mixed-media data encoding apparatus, in which said mixed-media data includes a plurality of data types, comprising encoding means configured to encode said mixed-media data to prevent unauthorised access and; storage means configured to store said encoded data, wherein user access to said data is possible in response to an accessing activity performed by a user and, in a first level access, a first set of user modifications may be made for editing a first set of said data types in response to a first accessing activity and, in a second level access, a second set of user modifications may be made for editing a second set of said data types in response to a second accessing activity.

2. Apparatus according to claim 1, wherein said storage means is a local hard drive, a removable disk, a Compact Disc Read-Only Media or a Digital Versatile Disk.

3. Apparatus according to claim 1, further comprising data distribution means for distributing said encoded data over a distribution channel.

4. Apparatus according to claim 3, wherein said distribution channel is a television broadcast channel or the internet.

5. Encoded mixed-media data decoding apparatus, in which said data includes a plurality of data types, comprising receiving means arranged to receive an encoded media data file; and activity responsive means configured to respond to an accessing activity, wherein a first accessing activity provides a first level of access for modifying a first set of said data types and a second accessing activity provides a second level of access for modifying a second of set said data types.

6. Apparatus according to claim 5, wherein said receiving means includes a disk reader, a Compact Disc Read-Only Media reader, a Digital Versatile Disk reader, an internet connection or a television receiver.

7. Apparatus according to claim 5, wherein said receiving means includes decryption means configured to decrypt an encrypted portion of the media data, including said data types, with the assistance of data read from a non-encrypted portion to produce decrypted data.

8. Apparatus according to claim 5, wherein said activity responsive means is configured to read an access defining portion of said decrypted data to determine the nature of said accessing activities.

9. Apparatus according to claim 8, wherein said access defining portion of said decrypted data defines a plurality of passwords and said activity responsive means is responsive to said passwords being identified so as to provide a particular level of access to said data.

10. Apparatus according to claim 9, wherein said activity responsive means is responsive to passwords being entered manually by a user.

11. A method of encoding mixed-media data, in which said data includes a plurality of media data types, comprising encoding said media data to prevent unauthorised access, wherein user access to said media data is possible in response to an accessing activity performed by a user; and access to said media data is responsive to a plurality of accessing activities in which a first accessing activity provides a first level of access for modifying a first set of said media types and a second accessing activity provides a second level of access for modifying a second set of said media types.

12. A method according to claim 11, wherein said media data types include motion data, model data, deformation parameters, constraints, expressions or relations, textures, colour values, cameras, lights, video, audio, device information, a timeline or user data or any combination of these data types.

13. A method according to claim 11, wherein said encoding includes adding access passwords to produce an internal file with passwords.

14. A method according to claim 13, wherein said encoding includes encrypting said internal file to produce an encrypted internal file.

15. A method according to claim 14, wherein said encoding includes adding an encryption key or a portion of said encryption key to a header to produce an encoded export file.

16. A method according to claim 15, wherein said encoding adds random data to selected positions of said header.

17. A method of decoding encoded media data, in which said media data includes a plurality of image related and/or audio related data types, comprising receiving and encoded media data file; and performing an activity in order to gain access to one or more of said data types, wherein a first accessing activity provides a first level of access for modifying a first set of said data types and a second accessing activity provides a second level of access for modifying a second set of said data types.

18. A method according to claim 17, wherein said activity comprises identifying a password.

19. A method according to claim 17, wherein said first level of access provides for the rendering and playback of three-dimensional data so as to produce two-dimensional output.

20. A method according to claim 17, wherein said second level of access allows behaviour triggering to be modified.

21. A method according to claim 17, wherein a third accessing activity provides a third level of access that allows scene control.

22. A method according to claim 17, wherein a fourth accessing activity provides a fourth level of access that allows clip libraries to be modified.

23. A method according to claim 17, wherein a fifth accessing activity provides a fifth level of access that allows animation to be edited.

24. A method according to claim 17, wherein a sixth accessing activity provides a sixth level of access that allows model editing and texture editing to be performed.

25. A method according to claim 17, wherein a seventh accessing activity provides a seventh level of access that allows full control to the data.

26. A computer-readable medium having computer-readable instructions executable by a computer such that, when executing said instructions, a computer will perform a process comprising: encoding said media data to prevent unauthorised access, wherein user access to said media data is possible in response to an accessing activity performed by a user; and access to said media data is responsive to a plurality of accessing activities in which a first accessing activity provides a first level of access for modifying a first set of said media data and a second accessing activity provides a second level of access for modifying a second set of said media data.

27. A computer-readable medium having computer-readable instructions executable by a computer such that, when executing said instructions a computer will perform a method in accordance with any of claims 12 to 16.

28. A computer-readable medium having computer-readable instructions executable by a computer such that, when executing said instructions, a computer will perform a process comprising: receiving an encoded media data file including a plurality of data types; and performing an activity in order to gain access to one or more of said data types, wherein a first accessing activity provides a first level of access for modifying a first set of said data types and a second accessing activity provides a second level of access for modifying a second set of said data types.

29. A computer-readable medium having computer-readable instructions executable by a computer such that, when executing said instructions a computer will perform a method in accordance with any of claims 18 to 25.

30. A media data format for communicating media data from a source station to a destination station in an encoded form, in which said media data includes a plurality of image related and/or audio related data types, wherein: media data is encoded at a transmitting station; said encoded data is transmitted to a receiving station; and said transmitted data is decoded at a receiving station, wherein said transmitted encoded data includes data fields configured to allow levels of access to a user in response to particular user access activities.

31. A media data format according to claim 30, wherein said media data types include motion capture data, model data, deformation parameters, constraints, expressions or relations, textures, colour values, cameras, lights, video, audio, device information or a timeline or any combination of these data types.

32. A media data format according to claim 30, wherein said encoded data includes a header containing an encryption key or a portion of said encryption key.

33. A media data format according to claim 32, wherein said header includes random data at selected positions in said header.

34. A media data format according to claim 32, wherein said encoded data includes an encrypted portion encrypted by said encryption key.

35. A media data format according to claim 34, wherein said encrypted portion includes mixed-media data types and access passwords.

36. A computer readable medium having a first data field for mixed-media data and a second data field for access data, wherein said mixed-media data includes a plurality of data types; and said access data is used to determine the validity of an accessing activity, wherein a first accessing activity provides a first level of access for modifying a first set of said mixed-media data and a second accessing activity provides a second level of access for modifying a second set of said mixed-media data.

37. A computer readable medium according to claim 36, wherein said first level of access provides for the rendering and playback of three-dimensional data so as to produce two-dimensional output.

38. A computer readable medium to claim 36, wherein said second level of access allows behaviour triggering to be modified.

39. A computer readable medium according to claim 36, wherein a third accessing activity provides a third level of access that allows scene control.

40. A computer readable medium according to claim 36, wherein a fourth accessing activity provides a fourth level of access that allows clip libraries to be modified.

41. A computer readable medium according to claim 36, wherein a fifth accessing activity provides a fifth level of access that allows animation to be edited.

42. A computer readable medium according to claim 36, wherein a sixth accessing activity provides a sixth level of access that allows model editing and texture editing to be performed.

43. A computer readable medium according to claim 36, wherein a seventh accessing activity provides a seventh level of access that allows full control to the data.

44. A computer readable medium according to claim 36, wherein said first data field for media data and said second data field for accessing data are encrypted.

45. A computer readable medium according to claim 44, including a header having an encryption key or part of an encryption key embedded therein to facilitate the decryption of said encrypted data fields.

\* \* \* \* \*

UNITED STATES PATENT AND TRADEMARK OFFICE
CERTIFICATE OF CORRECTION

PATENT NO. : 7,461,405 B2
APPLICATION NO. : 09/842317
DATED : December 2, 2008
INVENTOR(S) : Yves Boudreault et al.

It is certified that error appears in the above-identified patent and that said Letters Patent is hereby corrected as shown below:

Column 3, Line 46, change "Diagital" to --Digital--.

Column 7, Line 17, change "control" to --controls--.

Column 8, Lines 4-5, below ""Twofish."" delete "Further details concerning Twofish cipher may be found at http://counterpane.com/twofish.html.".

Column 8, Line 11, change "Pseudo-Hademarde" to --Pseudo-Hadamard--.

Column 8, Lines 13-19, below "schedule." delete "Twofish is a one hundred and twenty eight bit block cipher that accepts a variable length key up to two hundred and fifty six bits. The cipher is a sixteen round Feistel network with a bijective F function made up of four key dependent eight by eight S boxes, are fixed four by four maximum distance separable matrix, a Pseudo-Handemarde transform, bytwise rotations and a carefully designed key schedule." and insert --The particular type of encryption used is not an essential feature of the present invention. However, in order to be suitable, the data encryption process must provide a sufficient degree of protection, such as that provided by Twofish, in a time frame considered to be acceptable in commercial applications.--.

Column 11, Line 58, after "first set of said media" insert --data--.

Column 11, Line 60, after "second set of said media" insert --data--.

Column 12, Line 14, change "and" to --an--.

Column 12, Line 56, change "said instructions" to --said instructions,--.

UNITED STATES PATENT AND TRADEMARK OFFICE
CERTIFICATE OF CORRECTION

| | |
|---|---|
| PATENT NO. | : 7,461,405 B2 |
| APPLICATION NO. | : 09/842317 |
| DATED | : December 2, 2008 |
| INVENTOR(S) | : Yves Boudreault et al. |

It is certified that error appears in the above-identified patent and that said Letters Patent is hereby corrected as shown below:

Column 13, Line 3, change "said instructions" to --said instructions,--.

Signed and Sealed this

Seventeenth Day of February, 2009

JOHN DOLL
*Acting Director of the United States Patent and Trademark Office*